US012673282B2

(12) United States Patent
Kronawitt et al.

(10) Patent No.: US 12,673,282 B2
(45) Date of Patent: Jul. 7, 2026

(54) COALESCER FILTER MEDIA

(71) Applicant: Hollingsworth & Vose Company, East Walpole, MA (US)

(72) Inventors: Julia Anuscha Kronawitt, Marburg (DE); Thomas Petri, Breidenbach (DE)

(73) Assignee: Hollingsworth & Vose Company, East Walpole, MA (US)

( * ) Notice: Subject to any disclaimer, the term of this patent is extended or adjusted under 35 U.S.C. 154(b) by 322 days.

(21) Appl. No.: 18/406,855

(22) Filed: Jan. 8, 2024

(65) Prior Publication Data

US 2025/0222379 A1 Jul. 10, 2025

(51) Int. Cl.
B01D 39/14 (2006.01)
B01D 35/02 (2006.01)
B01D 39/20 (2006.01)
B01D 46/00 (2022.01)

(52) U.S. Cl.
CPC ....... B01D 39/2024 (2013.01); B01D 46/003 (2013.01); *B01D 2239/0421* (2013.01); *B01D 2239/0428* (2013.01); *B01D 2239/0618* (2013.01); *B01D 2239/086* (2013.01); *B01D 2239/1216* (2013.01); *B01D 2239/1233* (2013.01); *B01D 2239/1258* (2013.01); *B01D 2239/1291* (2013.01)

(58) Field of Classification Search
CPC .............. B01D 39/2024; B01D 46/003; B01D 2239/0421; B01D 2239/0428; B01D 2239/0618; B01D 2239/086; B01D 2239/1216; B01D 2239/1233; B01D 2239/1258; B01D 2239/1291; B01D 39/1623; B01D 2239/065; B01D 2239/0654; B01D 2239/1208; B01D 39/2017

USPC ...... 95/273, 287; 55/527, DIG. 25; 442/227, 442/340, 348

See application file for complete search history.

(56) References Cited

U.S. PATENT DOCUMENTS

| | | |
|---|---|---|
| 5,580,459 A | 12/1996 | Powers et al. |
| 5,672,399 A | 9/1997 | Kahlbaugh et al. |
| 5,785,725 A | 7/1998 | Cusick et al. |
| 6,171,684 B1 | 1/2001 | Kahlbaugh et al. |
| 7,008,465 B2 | 3/2006 | Graham et al. |
| 7,137,510 B1 | 11/2006 | Klein et al. |
| 7,314,497 B2 | 1/2008 | Kahlbaugh et al. |

(Continued)

OTHER PUBLICATIONS

Invitation to Pay Additional Fees for International Application No. PCT/US2025/010557 dated Mar. 11, 2025.

(Continued)

*Primary Examiner* — Frank M Lawrence, Jr.

(74) *Attorney, Agent, or Firm* — Wolf, Greenfield & Sacks, P.C.

(57) ABSTRACT

Filter media are generally described. In some embodiments, a filter media has one or more properties that enhance its suitability for use in coalescer filters. For instance, the filter media may have a particularly low pressure drop and/or may have a particularly high efficiency. In some instances, such properties may be obtained without the inclusion of fluorinated materials, government-regulated substances, and/or toxic substances (e.g., PFAS) in the filter media or with the inclusion of no more than de minimis amounts of such substances.

20 Claims, 3 Drawing Sheets

200

202

204

(56) References Cited

U.S. PATENT DOCUMENTS

| | | | | |
|---|---|---|---|---|
| 2002/0083837 A1* | 7/2002 | Doherty | ............ | B01D 46/0035 |
| | | | | 55/497 |
| 2010/0212272 A1* | 8/2010 | Sealey | ............... | B01D 39/2024 |
| | | | | 55/511 |
| 2018/0243673 A1 | 8/2018 | Shim et al. | | |
| 2018/0361287 A1* | 12/2018 | Zhang | .................... | B01D 39/18 |
| 2022/0387916 A1 | 12/2022 | Jaganathan et al. | | |
| 2023/0051258 A1* | 2/2023 | Jaganathan | ............ | B01D 39/18 |
| 2023/0149839 A1 | 5/2023 | Yegya Raman et al. | | |
| 2023/0330577 A1 | 10/2023 | Yegya Raman et al. | | |
| 2023/0415081 A1* | 12/2023 | Smith | ................ | B01D 39/1623 |
| 2024/0399631 A1 | 12/2024 | Petri et al. | | |

OTHER PUBLICATIONS

International Search Report and Written Opinion for International Application No. PCT/US2025/010557 dated May 7, 2025.

* cited by examiner

100

200

COALESCER FILTER MEDIA

FIELD

The present disclosure relates generally to filter media, and, more particularly, to filter media suitable for coalescer applications.

BACKGROUND

Filter media may be employed in a variety of applications. For instance, filter media may be employed to remove contaminants from fluids. Some filter media may include undesirable components (e.g., government-regulated components) and/or exhibit undesirable properties (e.g., low efficiency and/or high pressure drop).

Accordingly, improved filter media designs are needed.

SUMMARY

Filter media, related components, and related methods are generally described.

In some embodiments, a filter media is provided. The filter media comprises a fiber web comprising glass fibers and a resin. The fiber web has a coalescer gamma value of less than or equal to 30. The fiber web has a basis weight of greater than or equal to 130 gsm. The fiber web is oleophilic.

In some embodiments, a filter media is provided that comprises a fiber web comprising glass fibers. The fiber web has a basis weight of greater than or equal to 130 gsm. The fiber web comprises pores. Pores having a diameter of less than 1.25 microns make up less than or equal to 30% of the pores. Pores having a diameter of greater than or equal to 1.25 microns and less than 2.5 microns make up greater than or equal to 40% of the pores. A ratio of a number of pores having a diameter of less than 1.25 microns to a number of pores having a diameter of greater than or equal to 1.25 microns and less than 2.5 microns is less than or equal to 1.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Filter media are generally described. In some embodiments, a filter media has one or more properties that enhance its suitability for use in coalescer filters. For instance, the filter media may have a particularly low pressure drop and/or may have a particularly high efficiency. In some instances, such properties may be obtained without the inclusion of fluorinated materials, government-regulated substances, and/or toxic substances (e.g., PFAS) in the filter media or with the inclusion of no more than de minimis amounts of such substances.

Some filter media described herein comprise a fiber web having a pore structure such that the amounts of pores, and/or relative amounts of pores, having particular sizes is beneficial. For instance, a fiber web may have a relatively low number and/or percentage of pores that are so small that they unduly increase the pressure drop. As another example, a fiber web may have a relatively low number and/or percentage of pores that are so large that they unduly decrease the efficiency. As a third example, in some embodiments, a fiber web has a relatively high number and/or percentage of pores that are large enough to maintain an acceptable pressure drop but small enough to maintain an acceptable efficiency.

Some filter media described herein comprise a fiber web having a relatively high basis weight. Including a single fiber web having a relatively high basis weight may result in advantages that do not accrue to filter media having multiple, lighter fiber webs, such as improved performance.

Some filter media described herein comprise a fiber web that both has a relatively high basis weight and is wet laid. Without wishing to be bound by any particular theory, it is believed that, during wet laying, fiber webs are formed as the liquid is drained from a fiber-containing liquid. As the liquid is drained, it can affect the orientations and/or compression of the fibers in the final fiber web. It is also believed that the wet laying of fiber webs having a relatively high basis weight involves the drainage of liquid in a manner that promotes the formation of a pore structure having an advantageous distribution of pore sizes as described herein.

Some filter media described herein are relatively oleophilic and/or comprise one or more components that are relatively oleophilic. Such components may advantageously lack oleophobic components that are regulated by government bodies while still having acceptable performance for coalescer applications.

Figure 1:
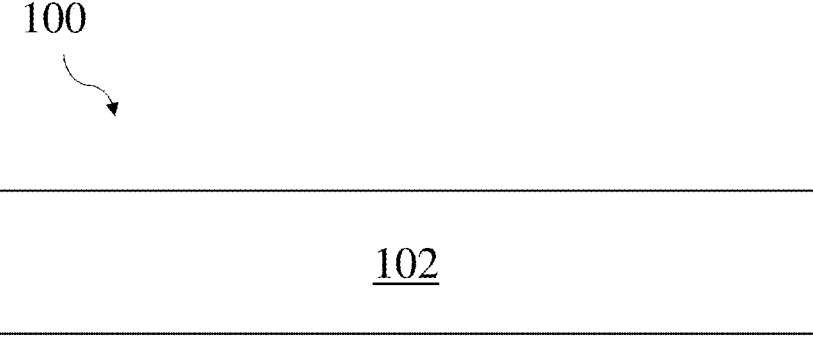
FIGS. 1 and 2 show two non-limiting embodiments of filter media in accordance with some embodiments.

FIG. 1 shows one non-limiting embodiment of a filter media. In FIG. 1, the filter media 100 comprises a fiber web 102. The fiber webs described herein, like the fiber web shown in FIG. 1, may be non-woven fibers, such as wet laid fiber webs.

Figure 2:
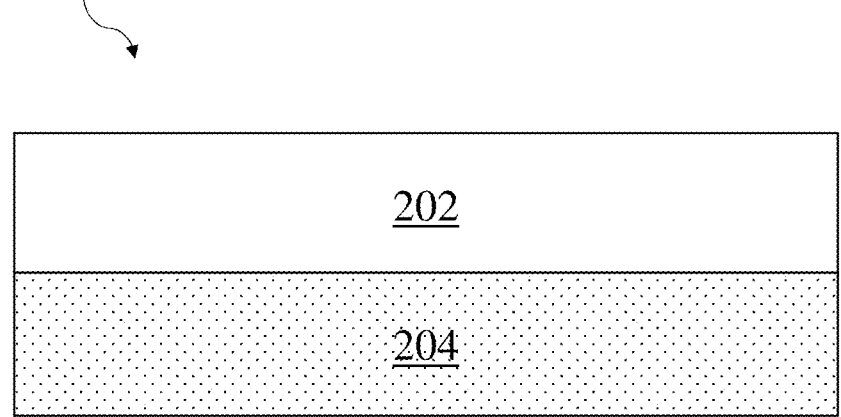

In some embodiments, a filter media comprises one or more layers in addition to a fiber web, such as one or more additional fiber webs (e.g., one or more non-woven fiber webs). In some embodiments, a filter media comprises an additional layer that is a protective layer. FIG. 2 shows one non-limiting embodiment of such a filter media. In FIG. 2, the filter media 200 comprises a fiber web 202 (e.g., a first fiber web) and a further layer 204 (e.g., a second fiber web). Further additional fibers webs (not shown) may optionally be present (e.g., a third fiber web, a fourth fiber web, a fifth fiber web, etc.).

In some embodiments, adjacent layers may be physically distinct from each other and/or may be physically separable without the use of specialized tools. Similarly, adjacent fiber webs may be physically distinct from each other and/or may be physically separable without the use of specialized tools. In some embodiments, two adjacent layers and/or fiber webs may comprise an interface therebetween that is indicative of two separate layers adjacent to each other across the interface. Some such interfaces can be observed via microscopy (e.g., via scanning electron microscopy) and/or density gradient structural analysis. A single layer and/or fiber web may not be separable into two or more components without the use of specialized tools and/or may lack such an interface.

In embodiments including multiple additional layers (e.g., themselves comprising one or more additional fiber webs), the positioning of the additional layers may be selected as desired. In some embodiments, all of the additional layers are positioned on a single side of a fiber web (e.g., the fiber web is an external layer). In some embodiments, a fiber web is surrounded on both opposing sides by additional layers (e.g., the fiber web is an internal layer).

A filter media may comprise two or more layers that are identical to each other (e.g., two or more fiber webs that are identical to each other) and/or may comprise two or more layers that differ from each other in one or more ways. Additionally, it should be understood that the fiber webs described herein may have some, all, or none of the features described below with respect to fiber webs.

It should also be noted that some filter media described herein may be comprise one or more fiber webs that are multiphasic. For example, a fiber web present in a filter media may comprise two or more phases that interpenetrate and/or that are intermingled with each other. For example, in some embodiments of a multiphasic fiber web, the fiber web comprises an interface between a first and second phase, and the interface comprises at least some fibers from the first phase intermingling and/or intertwined with at least some fibers from the second phase. In some embodiments, the interface comprises each of the fibers from the first phase intermingling and/or intertwined with each of the fibers from the second phase. The interface may, in some embodiments, take the form of a transition phase between the first and second phase. It is also possible for the interface to be substantially non-linear and/or to substantially lack (e.g., to lack) adhesive. In some embodiments, two phases are not joined by lamination.

In some cases, despite having one or more of the above properties, a multiphasic fiber web comprises two or more phases that cannot be physically separated without the use of specialized tools. In such instances, physical interactions between the fibers in the phases may be sufficient to join the phases together. Similarly, in some embodiments, a multiphasic fiber web comprises an interface between two phases that can be observed via a technique described above for observing an interface between two adjacent fiber webs, but that is observably different from the type of interface between two adjacent fiber webs.

The types and arrangements of phases in a multiphasic fiber web may be selected as desired. Some multiphasic fiber webs comprise one phase that is layered on top of another. Each phase in a multiphasic fiber web may have one or more features that differ (e.g., fiber type(s), average fiber diameter(s), pore structure, etc.), and, possibly, one or more features in common.

In some embodiments, a fiber web comprises glass fibers. In such instances, the amount of glass fibers present in the fiber web may be selected as desired. Glass fibers may make up greater than or equal to 0.1 wt %, greater than or equal to 0.2 wt %, greater than or equal to 0.5 wt %, greater than or equal to 0.75 wt %, greater than or equal to 1 wt %, greater than or equal to 2 wt %, greater than or equal to 5 wt %, greater than or equal to 7.5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, greater than or equal to 60 wt %, greater than or equal to 65 wt %, greater than or equal to 70 wt %, greater than or equal to 75 wt %, greater than or equal to 80 wt %, greater than or equal to 85 wt %, greater than or equal to 90 wt %, greater than or equal to 95 wt %, greater than or equal to 99 wt %, or greater than or equal to 99.5 wt % of the fiber web and/or a phase thereof. Glass fibers may make up less than or equal to 99.9 wt %, less than or equal to 99.5 wt %, less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, less than or equal to 55 wt %, less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 7.5 wt %, less than or equal to 5 wt %, less than or equal to 2 wt %, less than or equal to 1 wt %, less than or equal to 0.75 wt %, less than or equal to 0.5 wt %, or less than or equal to 0.2 wt % of the fiber web and/or a phase thereof. Combinations of the above-referenced ranges are also possible (e.g., greater than or equal to 0.1 wt % and less than or equal to 99.9 wt %, greater than or equal to 0.5 wt % and less than or equal to 99.5 wt %, or greater than or equal to 1 wt % and less than or equal to 99 wt %). Other ranges are also possible.

When two or more types of glass fibers are present in a fiber web and/or phase, the amount of each type of glass fiber present in the fiber web and/or phase may independently be in one or more of the above-referenced ranges and/or all of the glass fibers together may be present in an amount in one or more of the above-referenced ranges. When two or more fiber webs and/or phases comprising glass fibers are present, the preceding sentence may be independently true for each such fiber web and/or phase.

Glass fibers present in a fiber web may have a variety of suitable average diameters. In some embodiments, the glass fibers present in a fiber web and/or a phase have an average diameter of greater than or equal to 0.2 microns, greater than or equal to 0.5 microns, greater than or equal to 0.75 microns, greater than or equal to 1 micron, greater than or equal to 2 microns, greater than or equal to 4 microns, greater than or equal to 6 microns, or greater than or equal to 8 microns. In some embodiments, the glass fibers present in a fiber web and/or a phase have an average diameter of less than or equal to 10 microns, less than or equal to 8 microns, less than or equal to 6 microns, less than or equal to 4 microns, less than or equal to 2 microns, less than or equal to 1 micron, less than or equal to 0.75 microns, or less than or equal to 0.5 microns. Combinations of the above-referenced ranges are also possible (e.g., greater than or equal to 0.2 microns and less than or equal to 10 microns, greater than or equal to 0.2 microns and less than or equal to 8 microns, or greater than or equal to 0.2 microns and less than or equal to 6 microns). Other ranges are also possible.

When two or more types of glass fibers are present in a fiber web and/or phase, the average diameter of each type of glass fiber present in the fiber web and/or phase may independently be in one or more of the above-referenced ranges and/or all of the glass fibers together may have an average diameter in one or more of the above-referenced ranges. When two or more fiber webs and/or phases comprising glass fibers are present, the preceding sentence may be independently true for each such fiber web and/or phase.

Glass fibers present in a fiber web may have a variety of suitable average lengths. In some embodiments, the glass fibers present in a fiber web and/or phase have an average length of greater than or equal to 0.1 mm, greater than or equal to 0.2 mm, greater than or equal to 0.5 mm, greater than or equal to 0.75 mm, greater than or equal to 1 mm, greater than or equal to 1.5 mm, greater than or equal to 2 mm, or greater than or equal to 2.5 mm. In some embodiments, the glass fibers present in a fiber web and/or phase have an average length of less than or equal to 3 mm, less than or equal to 2.5 mm, less than or equal to 2 mm, less than or equal to 1.5 mm, less than or equal to 1 mm, less than or equal to 0.75 mm, less than or equal to 0.5 mm, or less than or equal to 0.2 mm. Combinations of the above-referenced ranges are also possible (e.g., greater than or equal to 0.1 mm and less than or equal to 3 mm, greater than or equal to 0.1 mm and less than or equal to 2 mm, or greater than or equal to 0.1 mm and less than or equal to 1.5 mm). Other ranges are also possible.

When two or more types of glass fibers are present in a fiber web and/or phase, the average length of each type of glass fiber present in the fiber web and/or phase may independently be in one or more of the above-referenced ranges and/or all of the glass fibers together may have an average length in one or more of the above-referenced ranges. When two or more fiber webs and/or phases comprising glass fibers are present, the preceding sentence may be independently true for each such fiber web and/or phase.

A variety of suitable glass fibers may be employed in the fiber webs described herein. For instance, in some embodiments, a fiber web comprises microglass fibers. The microglass fibers may comprise microglass fibers drawn from bushing tips and further subjected to flame blowing or rotary spinning processes. In some cases, microglass fibers may be made using a remelting process. The microglass fibers may be microglass fibers for which alkali metal oxides (e.g., sodium oxides, magnesium oxides) make up 10-20 wt % of the fibers. Such fibers may have relatively lower melting and processing temperatures. Non-limiting examples of microglass fibers are B glass fibers, M glass fibers according to Man Made Vitreous Fibers by Nomenclature Committee of TIMA Inc. March 1993, Page 45, C glass fibers (e.g., Lauscha C glass fibers, JM 253 C glass fibers), and non-persistent glass fibers (e.g., fibers that are configured to dissolve completely in the fluid present in human lungs in less than or equal to 40 days, such as Johns Manville 481 fibers). It should be understood that microglass fibers present in a fiber web may comprise one or more of the types of microglass fibers described herein.

In some embodiments, a fiber web comprises synthetic fibers. In such instances, the amount of synthetic fibers present in the fiber web and/or phase may be selected as desired. Synthetic fibers may make up greater than or equal to 0.1 wt %, greater than or equal to 0.2 wt %, greater than or equal to 0.5 wt %, greater than or equal to 0.75 wt %, greater than or equal to 1 wt %, greater than or equal to 2 wt %, greater than or equal to 5 wt %, greater than or equal to 7.5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, or greater than or equal to 45 wt % of the fiber web and/or a phase thereof. Synthetic fibers may make up less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 7.5 wt %, less than or equal to 5 wt %, less than or equal to 2 wt %, less than or equal to 1 wt %, less than or equal to 0.75 wt %, less than or equal to 0.5 wt %, or less than or equal to 0.2 wt % of the fiber web and/or a phase thereof. Combinations of the above-referenced ranges are also possible (e.g., greater than or equal to 0.1 wt % and less than or equal to 50 wt %, greater than or equal to 0.5 wt % and less than or equal to 40 wt %, or greater than or equal to 1 wt % and less than or equal to 30 wt %). Other ranges are also possible.

When two or more types of synthetic fibers are present in a fiber web and/or phase, the amount of each type of synthetic fiber present in the fiber web and/or phase may independently be in one or more of the above-referenced ranges and/or all of the synthetic fibers together may be present in an amount in one or more of the above-referenced ranges. When two or more fiber webs and/or phases comprising synthetic fibers are present, the preceding sentence may be independently true for each such fiber web and/or phase.

Synthetic fibers suitable for inclusion in the fiber webs described herein may be of a variety of suitable types. Non-limiting examples of types of synthetic fibers that may be included in the fiber webs described herein include staple fibers, binder fibers, and multicomponent fibers. A fiber web may comprise monocomponent binder fibers and/or multicomponent binder fibers (e.g., bicomponent binder fibers, tricomponent binder fibers, binder fibers comprising four or more components).

Synthetic fibers other than binder fibers (e.g., synthetic staple fibers) present in a fiber web may have a variety of suitable average diameters. In some embodiments, the synthetic fibers other than binder fibers present in a fiber web and/or phase have an average diameter of greater than or equal to 3 microns, greater than or equal to 4 microns, greater than or equal to 5 microns, greater than or equal to 7.5 microns, greater than or equal to 10 microns, greater than or equal to 12.5 microns, greater than or equal to 15 microns, greater than or equal to 17.5 microns, greater than or equal to 20 microns, or greater than or equal to 22.5 microns. In some embodiments, the synthetic fibers other than binder fibers present in a fiber web and/or phase have an average diameter of less than or equal to 25 microns, less than or equal to 22.5 microns, less than or equal to 20 microns, less than or equal to 17.5 microns, less than or equal to 15 microns, less than or equal to 12.5 microns, less than or equal to 10 microns, less than or equal to 7.5 microns, less than or equal to 5 microns, or less than or equal to 4 microns. Combinations of the above-referenced ranges are also possible (e.g., greater than or equal to 3 microns and less than or equal to 25 microns, greater than or equal to 4 microns and less than or equal to 20 microns, or greater than or equal to 5 microns and less than or equal to 15 microns). Other ranges are also possible.

When two or more types of synthetic fibers other than binder fibers are present in a fiber web and/or phase, the average diameter of each type of such synthetic fibers present in the fiber web and/or phase may independently be in one or more of the above-referenced ranges and/or all of such synthetic fibers together may have an average diameter in one or more of the above-referenced ranges. When two or more fiber webs and/or phases comprising such synthetic fibers are present, the preceding sentence may be independently true for each such fiber web and/or phase.

Synthetic fibers other than binder fibers (e.g., synthetic staple fibers) present in a fiber web may have a variety of suitable average lengths. In some embodiments, the synthetic fibers other than binder fibers present in a fiber web and/or phase have an average length of greater than or equal to 2 mm, greater than or equal to 5 mm, greater than or equal to 7.5 mm, greater than or equal to 10 mm, greater than or equal to 12.5 mm, greater than or equal to 15 mm, greater than or equal to 17.5 mm, greater than or equal to 20 mm, or greater than or equal to 22.5 mm. In some embodiments, the synthetic fibers other than binder fibers present in a fiber web and/or phase have an average length of less than or equal to 25 mm, less than or equal to 22.5 mm, less than or equal to 20 mm, less than or equal to 17.5 mm, less than or equal to 15 mm, less than or equal to 12.5 mm, less than or equal to 10 mm, less than or equal to 7.5 mm, or less than or equal to 5 mm. Combinations of the above-referenced ranges are also possible (e.g., greater than or equal to 2 mm and less than or equal to 25 mm, greater than or equal to 2 mm and less than or equal to 20 mm, or greater than or equal to 2 mm and less than or equal to 15 mm). Other ranges are also possible.

When two or more types of synthetic fibers other than binder fibers are present in a fiber web and/or phase, the average length of each type of such synthetic fibers may independently be in one or more of the above-referenced ranges and/or all of such synthetic fibers together may have an average length in one or more of the above-referenced ranges. When two or more fiber webs and/or phases comprising such synthetic fibers are present, the preceding sentence may be independently true for each such fiber web and/or phase.

Synthetic staple fibers may comprise a variety of materials, including, but not limited to, poly(ester)s (e.g., poly(ethylene terephthalate), poly(butylene terephthalate)), poly(carbonate), poly(amide)s (e.g., various nylon polymers), poly(aramid)s, poly(imide)s, poly(olefin)s (e.g., poly(ethylene), poly(propylene)), poly(ether ether ketone), poly(acrylic)s (e.g., poly(acrylonitrile), dryspun poly(acrylic)), poly(vinyl alcohol), regenerated cellulose (e.g., synthetic cellulose such as cellulose acetate, rayon), copolymers of poly(ethylene) and PVDF, and poly(ether sulfone)s.

The amount of binder fibers present in a fiber web may be selected as desired. Binder fibers may make up greater than or equal to 0 wt %, greater than or equal to 1 wt %, greater than or equal to 2 wt %, greater than or equal to 3 wt %, greater than or equal to 4 wt %, greater than or equal to 5 wt %, greater than or equal to 6 wt %, greater than or equal to 7 wt %, greater than or equal to 8 wt %, greater than or equal to 9 wt %, or greater than or equal to 9.3 wt % of the fiber web and/or a phase thereof. Binder fibers may make up less than or equal to 9.5 wt %, less than or equal to 9.3 wt %, less than or equal to 9 wt %, less than or equal to 8 wt %, less than or equal to 7 wt %, less than or equal to 6 wt %, less than or equal to 5 wt %, less than or equal to 4 wt %, less than or equal to 3 wt %, less than or equal to 2 wt %, or less than or equal to 1 wt % of the fiber web and/or a phase thereof. Combinations of the above-referenced ranges are also possible (e.g., greater than or equal to 0 wt % and less than or equal to 9.5 wt %, greater than or equal to 0 wt % and less than or equal to 9.3 wt %, or greater than or equal to 0 wt % and less than or equal to 9 wt %). Other ranges are also possible. In some embodiments, binder fibers make up identically 0 wt % of a fiber web and/or a phase thereof.

When two or more types of binder fibers are present in a fiber web and/or phase, the amount of each type of binder fiber in the fiber web and/or phase may independently be in one or more of the above-referenced ranges and/or all of the binder fibers together may be present in an amount in one or more of the above-referenced ranges. When two or more fiber webs and/or phases comprising binder fibers are present, the preceding sentence may be independently true for each such fiber web and/or phase.

Binder fibers present in a fiber web may have a variety of suitable average diameters. In some embodiments, the binder fibers present in a fiber web and/or phase have an average diameter of greater than or equal to 1 micron, greater than or equal to 2 microns, greater than or equal to 3 microns, greater than or equal to 4 microns, greater than or equal to 5 microns, greater than or equal to 7.5 microns, greater than or equal to 10 microns, greater than or equal to 15 microns, greater than or equal to 20 microns, greater than or equal to 25 microns, greater than or equal to 30 microns, or greater than or equal to 35 microns. In some embodiments, the binder fibers present in a fiber web and/or phase have an average diameter of less than or equal to 40 microns, less than or equal to 35 microns, less than or equal to 30 microns, less than or equal to 25 microns, less than or equal to 20 microns, less than or equal to 15 microns, less than or equal to 10 microns, less than or equal to 7.5 microns, less than or equal to 5 microns, less than or equal to 4 microns, less than or equal to 3 microns, or less than or equal to 2 microns. Combinations of the above-referenced ranges are also possible (e.g., greater than or equal to 1 micron and less than or equal to 40 microns, greater than or equal to 2 microns and less than or equal to 35 microns, or greater than or equal to 2 microns and less than or equal to 30 microns). Other ranges are also possible.

When two or more types of binder fibers are present in a fiber web and/or phase, the average diameter of each type of binder fiber present in the fiber web and/or phase may independently be in one or more of the above-referenced ranges and/or all of binder fibers together may have an average diameter in one or more of the above-referenced ranges. When two or more fiber webs and/or phases comprising binder fibers are present, the preceding sentence may be independently true for each such fiber web and/or phase.

Binder fibers present in a fiber web may have a variety of suitable average lengths. In some embodiments, the binder fibers present in a fiber web and/or phase have an average length of greater than or equal to 2 mm, greater than or equal to 5 mm, greater than or equal to 7.5 mm, greater than or equal to 10 mm, greater than or equal to 12.5 mm, greater than or equal to 15 mm, greater than or equal to 17.5 mm, greater than or equal to 20 mm, or greater than or equal to 22.5 mm. In some embodiments, the binder fibers present in a fiber web and/or phase have an average length of less than or equal to 25 mm, less than or equal to 22.5 mm, less than or equal to 20 mm, less than or equal to 17.5 mm, less than or equal to 15 mm, less than or equal to 12.5 mm, less than or equal to 10 mm, less than or equal to 7.5 mm, or less than or equal to 5 mm. Combinations of the above-referenced ranges are also possible (e.g., greater than or equal to 2 mm and less than or equal to 25 mm, greater than or equal to 2 mm and less than or equal to 20 mm, or greater than or equal to 2 mm and less than or equal to 15 mm). Other ranges are also possible.

When two or more types of binder fibers are present in a fiber web and/or phase, the average length of each type of binder fiber may independently be in one or more of the above-referenced ranges and/or all of the binder fibers together may have an average length in one or more of the above-referenced ranges. When two or more fiber webs and/or phases comprising binder fibers are present, the preceding sentence may be independently true for each such fiber web and/or phase.

Non-limiting examples of suitable materials that may be included in synthetic binder fibers include poly(vinyl alcohol); poly(olefin)s such as poly(ethylene), poly(propylene), and poly(butylene); poly(ester)s and co-poly(ester)s such as poly(ethylene terephthalate), co-poly(ethylene terephthalate), poly(butylene terephthalate), and poly(ethylene isophthalate); poly(amide)s and co-poly(amides) such as nylons and aramids; epoxy; phenolic resins; and melamine. Suitable co-poly(ethylene terephthalate)s may comprise repeat units formed by the polymerization of ethylene terephthalate monomers and further comprise repeat units formed by the polymerization of one or more comonomers. Such comonomers may include linear, cyclic, and branched aliphatic dicarboxylic acids having 4-12 carbon atoms (e.g., butanedioic acid, pentanedioic acid, hexanedioic acid, dodecanedioic acid, and 1,4-cyclo-hexanedicarboxylic acid); aromatic dicarboxylic acids having 8-12 carbon atoms (e.g., isophthalic acid and 2,6-naphthalenedicarboxylic acid); linear, cyclic, and branched aliphatic diols having 3-8 carbon atoms (e.g., 1,3-propane diol, 1,2-propanediol, 1,4-butanediol, 3-methyl-1,5-pentanediol, 2,2-dimethyl-1,3-propanediol, 2-methyl-1,3-propanediol, and 1,4-cyclohexanediol); and/or aliphatic and aromatic/aliphatic ether glycols having 4-10 carbon atoms (e.g., hydroquinone bis(2-hydroxyethyl) ether and poly(ethylene ether) glycols having a molecular weight below 460 g/mol, such as diethylene ether glycol).

Synthetic multicomponent fibers may comprise bicomponent fibers (i.e., fibers including two components), may comprise tricomponent fibers (i.e., fibers including three components), and/or may comprise fibers comprising four or more components. Multicomponent fibers may have a variety of suitable structures. For instance, a fiber web and/or phase may comprise one or more of the following types of bicomponent fibers: core/sheath fibers (e.g., concentric core/sheath fibers, non-concentric core-sheath fibers), segmented pie fibers, side-by-side fibers, tip-trilobal fibers, split fibers, and "island in the sea" fibers. Core-sheath bicomponent fibers may comprise a sheath that has a lower melting point than that of the core. When heated (e.g., during a binding step), the sheath may melt prior to the core, binding the multicomponent fibers together while the core remains solid. In such embodiments, the multicomponent fibers may serve as a binder for the fiber web and/or phase.

Non-limiting examples of suitable pairs of materials that may be included in bicomponent fibers include poly(ethylene)/poly(ester) (e.g., poly(ethylene)/poly(ethylene terephthalate)), poly(propylene)/poly(ester) (e.g., poly(propylene)/poly(ethylene terephthalate)), co-poly(ester)/poly(ester) (e.g., co-poly(ethylene terephthalate)/poly(ethylene terephthalate)), poly(butylene terephthalate)/poly(ethylene terephthalate), co-poly(amide)/poly(amide), poly(amide)/poly(propylene), and poly(ethylene)/poly(propylene). In the preceding list, the material having the lower melting point is listed first and the material having the higher melting point is listed second. Core-sheath bicomponent fibers comprising one of the above such pairs may have a sheath comprising the first material and a core comprising the second material. In one set of embodiments, core-sheath bicomponent fibers may comprise a core that comprises a thermoset polymer and a sheath that comprises a thermoplastic polymer.

The binder and multicomponent fibers described herein may comprise components having a variety of suitable melting points. In some embodiments, a binder fiber and/or a multicomponent fiber comprises a component having a melting point of greater than or equal to 70° C., greater than or equal to 80° C., greater than or equal to 90° C., greater than or equal to 100° C., greater than or equal to 110° C., greater than or equal to 120° C., greater than or equal to 130° C., greater than or equal to 140° C., greater than or equal to 150° C., greater than or equal to 160° C., greater than or equal to 170° C., greater than or equal to 180° C., greater than or equal to 190° C., greater than or equal to 200° C., greater than or equal to 210° C., greater than or equal to 220° C., greater than or equal to 250° C., greater than or equal to 300° C., greater than or equal to 250° C., greater than or equal to 300° C., greater than or equal to 350° C., or greater than or equal to 400° C. In some embodiments, a binder fiber and/or a multicomponent fiber comprises a component having a melting point less than or equal to 450° C., less than or equal to 400° C., less than or equal to 350° C., less than or equal to 300° C., less than or equal to 250° C., less than or equal to 220° C., less than or equal to 210° C., less than or equal to 200° C., less than or equal to 190° C., less than or equal to 180° C., less than or equal to 170° C., less than or equal to 160° C., less than or equal to 150° C., less than or equal to 140° C., less than or equal to 130° C., less than or equal to 120° C., less than or equal to 110° C., less than or equal to 100° C., less than or equal to 90° C., or less than or equal to 80° C. Combinations of the above-referenced ranges are also possible (e.g., greater than or equal to 70° C. and less than or equal to 450° C., greater than or equal to 80° C. and less than or equal to 450° C., greater than or equal to 80° C. and less than or equal to 230° C., or greater than or equal to 110° C. and less than or equal to 230° C.). Other ranges are also possible. In some embodiments, a binder fiber and/or a multicomponent fiber comprises a component having a melting point of less than or equal to 100° C.

The melting point of the components of binder fibers and multicomponent fibers may be determined by performing differential scanning calorimetry. The differential scanning calorimetry measurement may be carried out by heating the fiber to 500° C. at 20° C./minute, cooling the fiber to room temperature, and then determining the melting point during a reheating to 500° C. at 20° C./minute.

When a binder fiber and/or a multicomponent fiber comprises two components, each component may independently have a melting point in one or more of the above-referenced ranges. Binder fibers and multicomponent fibers comprising two or more components may comprise exclusively components having the same melting point, exclusively components having different melting points, or at least one pair of components that have the same melting point and at least one pair of components that have different melting points.

In some embodiments, a binder fiber and/or a multicomponent fiber comprises two components that have melting points that differ by greater than or equal to 50° C., greater than or equal to 75° C., greater than or equal to 100° C., greater than or equal to 125° C., greater than or equal to 150° C., greater than or equal to 175° C., greater than or equal to 200° C., greater than or equal to 225° C., greater than or equal to 250° C., greater than or equal to 275° C., greater than or equal to 300° C., greater than or equal to 325° C., or greater than or equal to 350° C. In some embodiments, a binder fiber and/or a multicomponent fiber comprises two components that have melting points that differ by less than or equal to 380° C., less than or equal to 350° C., less than or equal to 325° C., less than or equal to 300° C., less than or equal to 275° C., less than or equal to 250° C., less than or equal to 225° C., less than or equal to 200° C., less than or equal to 175° C., less than or equal to 150° C., less than or equal to 125° C., less than or equal to 100° C., or less than or equal to 75° C. Combinations of the above-referenced ranges are also possible (e.g., greater than or equal to 50° C. and less than or equal to 75° C.). Other ranges are also possible.

In some embodiments, a fiber web comprises fibrillated fibers. In such instances, the amount of fibrillated fibers present in the fiber web and/or phase may be selected as desired. Fibrillated fibers may make up greater than or equal to 0.1 wt %, greater than or equal to 0.2 wt %, greater than or equal to 0.5 wt %, greater than or equal to 0.75 wt %, greater than or equal to 1 wt %, greater than or equal to 2 wt %, greater than or equal to 5 wt %, greater than or equal to 7.5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, or greater than or equal to 45 wt % of the fiber web and/or a phase thereof. Fibrillated fibers may make up less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 7.5 wt %, less than or equal to 5 wt %, less than or equal to 2 wt %, less than or equal to 1 wt %, less than or equal to 0.75 wt %, less than or equal to 0.5 wt %, or less than or equal to 0.2 wt % of the fiber web and/or a phase thereof. Combinations of the above-referenced ranges are also possible (e.g., greater than or equal to 0.1 wt % and less than or equal to 50 wt %, greater than or equal to 0.5 wt % and less than or equal to 40 wt %, or greater than or equal to 1 wt % and less than or equal to 30 wt %). Other ranges are also possible.

When two or more types of fibrillated fibers are present in a fiber web and/or phase, the amount of each type of fibrillated fiber in the fiber web and/or phase may independently be in one or more of the above-referenced ranges and/or all of the fibrillated fibers together may be present in an amount in one or more of the above-referenced ranges. When two or more fiber webs and/or phases comprising fibrillated fibers are present, the preceding sentence may be independently true for each such fiber web and/or phase.

Fibrillated fibers present in a fiber web may have a variety of suitable average diameters. In some embodiments, the fibrillated fibers present in a fiber web and/or phase have an average diameter of greater than or equal to 0.1 micron, greater than or equal to 0.15 microns, greater than or equal to 0.2 microns, greater than or equal to 0.3 microns, greater than or equal to 0.5 microns, greater than or equal to 0.75 microns, greater than or equal to 1 micron, greater than or equal to 2 microns, greater than or equal to 3 microns, greater than or equal to 5 microns, greater than or equal to 7.5 microns, greater than or equal to 10 microns, greater than or equal to 13 microns, greater than or equal to 15 microns, or greater than or equal to 17.5 microns. In some embodiments, the fibrillated fibers present in a fiber web and/or phase have an average diameter of less than or equal to 20 microns, less than or equal to 17.5 microns, less than or equal to 15 microns, less than or equal to 13 microns, less than or equal to 10 microns, less than or equal to 7.5 microns, less than or equal to 5 microns, less than or equal to 3 microns, less than or equal to 2 microns, less than or equal to 1 micron, less than or equal to 0.75 microns, less than or equal to 0.5 microns, less than or equal to 0.2 microns, or less than or equal to 0.15 microns. Combinations of the above-referenced ranges are also possible (e.g., greater than or equal to 0.1 micron and less than or equal to 20 microns, greater than or equal to 0.1 micron and less than or equal to 15 microns, or greater than or equal to 0.15 microns and less than or equal to 13 microns). Other ranges are also possible.

When two or more types of fibrillated fibers are present in a fiber web and/or phase, the average diameter of each type of fibrillated fiber may independently be in one or more of the above-referenced ranges and/or all of the fibrillated fibers together may have an average diameter in one or more of the above-referenced ranges. When two or more fiber webs and/or phases comprising fibrillated fibers are present, the preceding sentence may be independently true for such each fiber web and/or phase.

Fibrillated fibers present in a fiber web may have a variety of suitable average lengths. In some embodiments, the fibrillated fibers present in a fiber web and/or phase have an average length of greater than or equal to 1 mm, greater than or equal to 1.25 mm, greater than or equal to 1.5 mm, greater than or equal to 1.75 mm, greater than or equal to 2 mm, greater than or equal to 2.5 mm, greater than or equal to 3 mm, greater than or equal to 3.5 mm, greater than or equal to 4 mm, greater than or equal to 4.5 mm, greater than or equal to 5 mm, or greater than or equal to 5.5 mm. In some embodiments, the fibrillated fibers present in a fiber web and/or phase have an average length of less than or equal to 6 mm, less than or equal to 5.5 mm, less than or equal to 5 mm, less than or equal to 4.5 mm, less than or equal to 4 mm, less than or equal to 3.5 mm, less than or equal to 3 mm, less than or equal to 2.5 mm, less than or equal to 2 mm, less than or equal to 1.75 mm, less than or equal to 1.5 mm, or less than or equal to 1.25 mm. Combinations of the above-referenced ranges are also possible (e.g., greater than or equal to 1 mm and less than or equal to 6 mm, greater than or equal to 1.5 mm and less than or equal to 5 mm, or greater than or equal to 2 mm and less than or equal to 4 mm). Other ranges are also possible.

When two or more types of fibrillated fibers are present in a fiber web and/or phase, the average length of each type of fibrillated fiber may independently be in one or more of the above-referenced ranges and/or all of the fibrillated fibers together may have an average length in one or more of the above-referenced ranges. When two or more fiber webs and/or phases comprising fibrillated fibers are present, the preceding sentence may be independently true for such each fiber web and/or phase.

Fibrillated fibers present in a fiber web may have a variety of suitable levels of fibrillation. In some embodiments, the fibrillated fibers have a Canadian Standard Freeness value of greater than or equal to 20 CSF, greater than or equal to 30 CSF, greater than or equal to 40 CSF, greater than or equal to 50 CSF, greater than or equal to 60 CSF, greater than or equal to 75 CSF, greater than or equal to 100 CSF, greater than or equal to 200 CSF, greater than or equal to 300 CSF, greater than or equal to 400 CSF, greater than or equal to 500 CSF, greater than or equal to 600 CSF, or greater than or equal to 700 CSF. In some embodiments, the fibrillated fibers have a Canadian Standard Freeness value of less than or equal to 850 CSF, less than or equal to 700 CSF, less than or equal to 600 CSF, less than or equal to 500 CSF, less than or equal to 400 CSF, less than or equal to 300 CSF, less than or equal to 200 CSF, less than or equal to 100 CSF, less than or equal to 75 CSF, less than or equal to 60 CSF, less than or equal to 50 CSF, less than or equal to 40 CSF, or less than or equal to 30 CSF. Combinations of the above-referenced ranges are also possible (e.g., greater than or equal to 20 CSF and less than or equal to 850 CSF, greater than or equal to 40 CSF and less than or equal to 700 CSF, or greater than or equal to 60 CSF and less than or equal to 500 CSF). Other ranges are also possible.

When two or more types of fibrillated fibers are present in a fiber web and/or phase, the Canadian Standard Freeness value of each type of fibrillated fiber may independently be in one or more of the above-referenced ranges and/or all of the fibrillated fibers together may have a Canadian Standard Freeness value in one or more of the above-referenced ranges. When two or more fiber webs and/or phases comprising fibrillated fibers are present, the preceding sentence may be independently true for such each fiber web and/or phase.

The Canadian Standard Freeness of fibrillated fibers can be measured according to a Canadian Standard Freeness test, specified by TAPPI test method T-227-om-09 Freeness of pulp. The test can provide an average CSF value.

Fibrillated fibers suitable for inclusion in the fiber webs described herein may be of a variety of suitable types. A fibrillated fiber may include a parent fiber that branches into smaller diameter fibrils, which can, in some instances, branch further out into even smaller diameter fibrils with further branching also being possible. The branched nature of the fibrils may enhance the surface area of a fiber web in which the fibrillated fibers are employed, and can increase the number of contact points between the fibrillated fibers and other fibers in the fiber web. Such an increase in points of contact between the fibrillated fibers and other fibers in the fiber web may enhance one or more mechanical properties (e.g., flexibility, strength, filtration efficiency) of the fiber web. The fibrillated fibers may be microfibrillated (e.g., they may comprise fibrils having diameters on the order of microns) and/or nanofibrillated (e.g., they may comprise fibrils having sub-micron diameters). It is also possible for a fibrillated fiber to lack parent fibers. Non-limiting examples of types of fibrillated fibers that may be included in the fiber webs described herein include lyocell, nanocellulose, and/or microfibrillated cellulose.

In some embodiments, a fiber web comprises a resin. In such instances, the amount of resin present in the fiber web and/or phase may be selected as desired. Resin may make up greater than or equal to 0.1 wt %, greater than or equal to 0.2 wt %, greater than or equal to 0.5 wt %, greater than or equal to 0.75 wt %, greater than or equal to 1 wt %, greater than or equal to 2 wt %, greater than or equal to 5 wt %, greater than or equal to 7.5 wt %, greater than or equal to 10 wt %, greater than or equal to 15 wt %, greater than or equal to 20 wt %, greater than or equal to 25 wt %, greater than or equal to 30 wt %, or greater than or equal to 35 wt % of the fiber web and/or a phase thereof. Resin may make up less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 7.5 wt %, less than or equal to 5 wt %, less than or equal to 2 wt %, less than or equal to 1 wt %, less than or equal to 0.75 wt %, less than or equal to 0.5 wt %, or less than or equal to 0.2 wt % of the fiber web and/or a phase thereof. Combinations of the above-referenced ranges are also possible (e.g., greater than or equal to 0.1 wt % and less than or equal to 40 wt %, greater than or equal to 0.5 wt % and less than or equal to 30 wt %, or greater than or equal to 1 wt % and less than or equal to 25 wt %). Other ranges are also possible.

When two or more types of resins are present in a fiber web and/or phase, the amount of each type of resin present in the fiber web and/or phase may independently be in one or more of the above-referenced ranges and/or all of the resins together may be present in an amount in one or more of the above-referenced ranges. When two or more fiber webs and/or phase comprising resins are present, the preceding sentence may be independently true for each such fiber web and/or phase.

Resins present in a fiber web may, in some embodiments, be oleophilic. In some embodiments, this may render a fiber web in which the resin is positioned oleophilic. For instance, a resin present in a fiber web may be sufficiently oleophilic that a fiber web and/or phase in which it is positioned has a relatively low oil rank. As an example, in some embodiments, a fiber web and/or phase comprising an oleophilic resin has an oil rank of identically 0. In some embodiments, a fiber web and/or phase comprising an oleophilic resin has an oil rank of less than or equal to 1 (and greater than or equal to 0). In some embodiments, a fiber web and/or phase comprising an oleophilic resin has an oleophilicity that is so high that it cannot be precisely measured by determining an oil rank. For instance, droplets of liquids having higher surface tensions than Kaydol that are formed according to the AATCC™ 118 (1997) procedure described below, placed on the fiber web and/or phase comprising the oleophilic resin in the manner described in this procedure, and analyzed by the procedure described below may wet the fiber web and/or phase surface as described by the procedure described below.

When two or more fiber webs and/or phases comprising an oleophilic resin are present, each fiber web and/or phase may independently have an oleophilicity and/or oil rank as described in the preceding paragraph.

Oil rank may be determined according to AATCC™ 118 (1997) measured at 23° C. and 50% relative humidity (RH). Briefly, five drops of each test oil (having an average droplet diameter of about 2 mm) are placed on five different locations on the surface of the fiber web and/or phase. The test oil with the greatest oil surface tension that does not wet the surface of the fiber web and/or phase (e.g., has a contact angle greater than or equal to 90° with the surface) after 30 seconds of contact with the fiber web and/or phase at 23° C. and 50% RH corresponds to the oil rank (listed in Table 1). For example, if a test oil with a surface tension of 26.6 mN/m does not wet (i.e., has a contact angle of greater than or equal to 90° with the surface) the surface of the fiber web and/or phase after 30 seconds, but a test oil with a surface tension of 25.4 mN/m wets the surface of the fiber web and/or phase within 30 seconds, the fiber web and/or phase has an oil rank of 4. By way of another example, if a test oil with a surface tension of 25.4 mN/m does not wet the surface of the fiber web and/or phase after 30 seconds, but a test oil with a surface tension of 23.8 mN/m wets the surface of the fiber web and/or phase within 30 seconds, the fiber web and/or phase has an oil rank of 5. By way of yet another example, if a test oil with a surface tension of 23.8 mN/m does not wet the surface of the fiber web and/or phase after 30 seconds, but a test oil with a surface tension of 21.6 mN/m wets the surface of the fiber web and/or phase within 30 seconds, the fiber web and/or phase has an oil rank of 6. In some embodiments, if three or more of the five drops partially wet the surface (e.g., form a droplet, but not a well-rounded drop on the surface) in a given test, then the oil rank is expressed to the nearest 0.5 value determined by subtracting 0.5 from the number of the test liquid. By way of example, if a test oil with a surface tension of 25.4 mN/m does not wet the surface of the fiber web and/or phase after 30 seconds, but a test oil with a surface tension of 23.8 mN/m only partially wets the surface of the fiber web and/or phase after 30 seconds (e.g., three or more of the test droplets form droplets on the surface of the fiber web and/or phase that are not well-rounded droplets) within 30 seconds, the fiber web and/or phase has an oil rank of 5.5. If all of the test oils listed below in Table 1 wet the surface of the fiber web and/or phase after 30 seconds, the fiber web and/or phase has an oil rank of 0.

TABLE 1

| Oil Rank | Test Oil | Surface Tension (mN/m) |
|---|---|---|
| 1 | Kaydol (mineral oil) | 31 |
| 2 | 65/35 Kaydol/n-hexadecane | 28 |
| 3 | n-hexadecane | 27.5 |
| 4 | n-tetradecane | 26.6 |
| 5 | n-dodecane | 25.4 |
| 6 | n-decane | 23.8 |
| 7 | n-octane | 21.6 |
| 8 | n-heptane | 20.1 |

Resins present in fiber webs may be hydrophilic or hydrophobic (e.g., in addition to being oleophilic).

Resins present in a fiber web may be hydrophilic or hydrophobic (e.g., in addition to being oleophilic). In some embodiments, a fiber web and/or phase comprising a resin has an aqueous solution repellency grade number of greater than or equal to 0, greater than or equal to 1, greater than or equal to 2, greater than or equal to 3, greater than or equal to 4, greater than or equal to 5, greater than or equal to 6, or greater than or equal to 7. In some embodiments, a fiber web comprising and/or phase a resin has an aqueous solution repellency grade number of less than or equal to 8, less than or equal to 7, less than or equal to 6, less than or equal to 5, less than or equal to 4, less than or equal to 3, less than or equal to 2, or less than or equal to 1. Combinations of the above-referenced ranges are also possible (e.g., greater than or equal to 0 and less than or equal to 8). Other ranges are also possible.

When two or more fiber webs and/or phases comprising a resin are present, each fiber web and/or phase may independently have an aqueous solution repellency grade number in one or more of the above-referenced ranges.

The aqueous solution repellency grade of a fiber web and/or phase may be determined in accordance with AATCC 193™ 193 (2005). Briefly, a procedure similar to that described above for determining the oil rank of a fiber web and/or phase may be performed except that: (1) Three droplets are employed for each test liquid; (2) Each droplet is allowed to contact the fiber web and/or phase for ten seconds; (3) Contact is performed at 21° C. and 65% RH; and (4) The test liquids and their corresponding aqueous solution repellency grade numbers are provided below in Table 2. As with the procedure for determining the oil rank, a fiber web and/or phase has an aqueous solution repellency grade number that is equivalent to the test liquid with the greatest surface tension that does not wet the surface of the fiber web and/or phase (e.g., has a contact angle greater than or equal to 90° with the surface) after the relevant contact procedure. If all of the test liquids listed below in Table 2 wet the surface of the fiber web and/or phase after 10 seconds, the fiber web and/or phase has an aqueous solution repellency grade of 0.

TABLE 2

| Aqueous Solution Repellency Grade | Test Liquid | Surface Tension (mN/m) |
|---|---|---|
| 1 | 98 vol % water/2 vol % isopropyl alcohol (IPA) | 59 |

TABLE 2-continued

| Aqueous Solution Repellency Grade | Test Liquid | Surface Tension (mN/m) |
|---|---|---|
| 2 | 95 vol % water/5 vol % IPA | 50 |
| 3 | 90 vol % water/10 vol % IPA | 42 |
| 4 | 80 vol % water/20 vol % IPA | 33 |
| 5 | 70 vol % water/30 vol % IPA | 27.5 |
| 6 | 60 vol % water/40 vol % IPA | 25.4 |
| 7 | 50 vol % water/50 vol % IPA | 24.5 |
| 8 | 40 vol % water/60 vol % IPA | 24 |

Resins suitable for inclusion in the fiber webs described herein may have a variety of suitable chemical compositions. Non-limiting examples of types of resins that may be included in the fiber webs described herein include those that comprise a thermoplastic polymer (e.g. acrylic, polyvinyl acetate, polyester, polyamide, polycarboxylic acid, nylon, etc.), those that comprise a thermoset polymer (e.g., epoxy, phenolic resin, melamine, etc.), and combinations thereof. In some embodiments, a resin includes one or more of a vinyl acetate resin and a polyvinyl alcohol resin. In some embodiments, a fiber web comprises an acrylic resin.

In some embodiments, a fiber web, a phase, and/or a filter media described herein includes a relatively low amount of fluorinated substances (e.g., molecules comprising one or more fluorine atoms, government-regulated fluorinated substances, toxic fluorinated substances, PFAS). In such embodiments, fluorinated substances may make up less than or equal to 10 wt %, less than or equal to 7.5 wt %, less than or equal to 5 wt %, less than or equal to 2.5 wt %, less than or equal to 1 wt %, less than or equal to 0.75 wt %, less than or equal to 0.5 wt %, less than or equal to 0.2 wt %, or less than or equal to 0.1 wt % of the fiber web, phase, and/or filter media. In such embodiments, fluorinated substances may make up greater than or equal to 0 wt %, greater than or equal to 0.1 wt %, greater than or equal to 0.2 wt %, greater than or equal to 0.5 wt %, greater than or equal to 0.75 wt %, greater than or equal to 1 wt %, greater than or equal to 2.5 wt %, greater than or equal to 5 wt %, or greater than or equal to 7.5 wt % of the fiber web, phase, and/or filter media. Combinations of the above-referenced ranges are also possible (e.g., les than or equal to 10 wt % and greater than or equal to 0 wt %). In some embodiments, fluorinated substances make up identically 0 wt % of a fiber web, phase, and/or filter media.

In some embodiments, a total fluorinated substance content of a fiber web, phase, or filter media is in one or more of the above-referenced ranges. In some embodiments, a total PFAS content of a fiber web, phase, or filter media is in one or more of the above-referenced ranges. When two or more fiber webs and/or phases are present in a filter media, the preceding two sentences may be independently true for such each fiber web and/or phase.

Fiber webs and phases thereof described herein may have a variety of suitable basis weights. In some embodiments, a fiber web and/or phase has a basis weight of greater than or equal to 130 gsm, greater than or equal to 140 gsm, greater than or equal to 150 gsm, greater than or equal to 175 gsm, greater than or equal to 200 gsm, greater than or equal to 225 gsm, greater than or equal to 250 gsm, greater than or equal to 275 gsm, greater than or equal to 300 gsm, greater than or equal to 325 gsm, greater than or equal to 350 gsm, or greater than or equal to 380 gsm. In some embodiments, a fiber web and/or phase has a basis weight of less than or equal to 400 gsm, less than or equal to 380 gsm, less than or equal to 350 gsm, less than or equal to 325 gsm, less than or equal to 300 gsm, less than or equal to 275 gsm, less than or equal to 250 gsm, less than or equal to 225 gsm, less than or equal to 200 gsm, less than or equal to 175 gsm, less than or equal to 150 gsm, or less than or equal to 140 gsm. Combinations of the above-referenced ranges are also possible (e.g., greater than or equal to 130 gsm and less than or equal to 400 gsm, greater than or equal to 140 gsm and less than or equal to 380 gsm, or greater than or equal to 150 gsm and less than or equal to 350 gsm). Other ranges are also possible.

When a filter media comprises two or more fiber webs and/or phases, each fiber web and/or phase may independently have a basis weight in one or more of the above-referenced ranges.

The basis weight of a fiber web or a phase may be measured in accordance with ISO 536:2012.

Some fiber webs and/or phases thereof described herein have relatively high values of coalescer gamma. In some embodiments, a fiber web and/or phase has a coalescer gamma value of less than or equal to 35, less than or equal to 30, less than or equal to 25, less than or equal to 20, less than or equal to 15, less than or equal to 10, less than or equal to 7.5, less than or equal to 5, or less than or equal to 2. In some embodiments, a fiber web and/or phase has a coalescer gamma value of greater than or equal to 1, greater than or equal to 2, greater than or equal to 5, greater than or equal to 7.5, greater than or equal to 10, greater than or equal to 15, greater than or equal to 20, greater than or equal to 25, or greater than or equal to 30. Combinations of the above-referenced ranges are also possible (e.g., less than or equal to 35 and greater than or equal to 1, or less than or equal to 30 and greater than or equal to 5). Other ranges are also possible.

When a filter media comprises two or more fiber webs and/or phases, each fiber web and/or phase may independently have a coalescer gamma value in one or more of the above-referenced ranges.

The coalescer gamma value of a fiber web or a phase may be determined by evaluating the equation below:

$$Coalescer\ Gamma = \frac{\Delta p_{saturated}}{-\log_{10}\left(\frac{100\% - Efficiency}{100\%}\right)},$$

where $\Delta p_{saturated}$ is the saturated pressure drop and efficiency is the efficiency for the mineral oil droplets described below.

The saturated pressure drop and efficiency may be determined by performing a procedure in which the fiber web or phase is exposed to mineral oil droplets and then measuring the pressure drop and the efficiency once the fiber web or phase has been saturated with mineral oil. This measurement may be performed while the fiber web or phase has a flat sheet geometry. The exposure may comprise generating mineral oil droplets with an aerosol generator, suspending these mineral oil droplets in air, and then blowing them at a 100 cm² portion of the fiber web or phase. The mineral oil may have a kinematic viscosity of 46 mm²/s and the droplets of the mineral oil may be polydisperse with an average diameter of less than 1 micron and greater than 0.1 micron. When impinging on the fiber web or phase, the air in which the mineral oil droplets are suspended may be traveling at a face velocity of 20 cm/s at atmospheric pressure. They may have a concentration in the air of 2.5 g/m³. During this process, the pressure drop may be measured by use of pressure sensors upstream and downstream of the fiber web and/or phase. The mineral oil particle concentration downstream from the fiber web and/or phase may be measured by scattered light spectroscopy.

When performing this procedure, saturation of the fiber web and/or phase is assessed by measuring the stability of the pressure drop thereacross. Saturation is achieved once the pressure drop is stable (i.e., when the pressure drop reaches an equilibrium value) for thirty minutes. The efficiency is the average efficiency calculated over the thirty-minute stability period and the saturated pressure drop is the average pressure drop calculated over the thirty-minute stability period.

Some fiber webs and phases described herein may, when subjected to the above-described process for measuring efficiency and pressure drop, allow a relatively low number of mineral oil droplets to pass thereacross. In some embodiments, over the period of time that the saturated pressure drop and efficiency are measured, the average concentration of mineral oil droplets downstream of the fiber web and/or phase is less than or equal to 1,000,000 droplets/cm³, less than or equal to 900,000 droplets/cm³, less than or equal to 800,000 droplets/cm³, less than or equal to 500,000 droplets/cm³, less than or equal to 200,000 droplets/cm³, less than or equal to 100,000 droplets/cm³, less than or equal to 75,000 droplets/cm³, less than or equal to 50,000 droplets/cm³, less than or equal to 20,000 droplets/cm³, less than or equal to 10,000 droplets/cm³, less than or equal to 7,500 droplets/cm³, less than or equal to 5,000 droplets/cm³, less than or equal to 2,000 droplets/cm³, less than or equal to 1,000 droplets/cm³, less than or equal to 750 droplets/cm³, less than or equal to 500 droplets/cm³, less than or equal to 200 droplets/cm³, less than or equal to 100 droplets/cm³, less than or equal to 75 droplets/cm³, less than or equal to 50 droplets/cm³, or less than or equal to 20 droplets/cm³. In some embodiments, over the period of time that the saturated pressure drop and efficiency are measured, the average concentration of mineral oil droplets downstream of the fiber web and/or phase is greater than or equal to 10 droplets/cm³, greater than or equal to 20 droplets/cm³, greater than or equal to 50 droplets/cm³, greater than or equal to 75 droplets/cm³, greater than or equal to 100 droplets/cm³, greater than or equal to 200 droplets/cm³, greater than or equal to 500 droplets/cm³, greater than or equal to 750 droplets/cm³, greater than or equal to 1,000 droplets/cm³, greater than or equal to 2,000 droplets/cm³, greater than or equal to 5,000 droplets/cm³, greater than or equal to 7,500 droplets/cm³, greater than or equal to 10,000 droplets/cm³, greater than or equal to 20,000 droplets/cm³, greater than or equal to 50,000 droplets/cm³, greater than or equal to 75,000 droplets/cm³, greater than or equal to 100,000 droplets/cm³, greater than or equal to 200,000 droplets/cm³, greater than or equal to 500,000 droplets/cm³, greater than or equal to 800,000 droplets/cm³, or greater than or equal to 900,000 droplets/cm³. Combinations of the above-referenced ranges are also possible (e.g., less than or equal to 1,000,000 droplets/cm³ and greater than or equal to 10 droplets/cm³). Other ranges are also possible.

When a filter media comprises two or more fiber webs and/or phases, each fiber web and/or phase may independently have an average concentration of mineral oil droplets downstream of the fiber web and/or phase over the period of time that the saturated pressure drop and efficiency are measured in one or more of the above-referenced ranges.

In some embodiments, a fiber web and/or phase has a relatively advantageous pore size distribution. In such instances, the fiber web and/or phase may have a relatively low number and/or percentage of pores that have a diameter of less than 1.25 microns. In some embodiments, less than 30%, less than or equal to 25%, less than or equal to 20%, less than or equal to 15%, less than or equal to 10%, or less than or equal to 7.5% of the pores in the fiber web and/or phase have a diameter of less than 1.25 microns. In some embodiments, greater than or equal to 5%, greater than or equal to 7.5%, greater than or equal to 10%, greater than or equal to 15%, greater than or equal to 20%, or greater than or equal to 25% of the pores in the fiber web and/or phase have a diameter of less than or equal to 1.25 microns. Combinations of the above-referenced ranges are also possible (e.g., less than or equal to 30% and greater than or equal to 5%). Other ranges are also possible.

When a filter media comprises two or more fiber webs and/or phases, each fiber web and/or phase may independently have a number and/or percentage of pores having a diameter of less than 1.25 microns in one or more of the above-referenced ranges.

The number and/or percentage of pores having a diameter of less than 1.25 microns may be measured in accordance with ASTM F316 (2003).

In some embodiments, a fiber web and/or phase may have a relatively high number and/or percentage of pores that have a diameter of greater than or equal to 1.25 microns and less than or equal to 2.5 microns. In some embodiments, greater than or equal to 40%, greater than or equal to 45%, greater than or equal to 50%, greater than or equal to 55%, greater than or equal to 60%, greater than or equal to 65%, greater than or equal to 70%, greater than or equal to 75%, greater than or equal to 80%, greater than or equal to 85%, or greater than or equal to 90% of the pores in the fiber web and/or phase have a diameter of greater than or equal to 1.25 microns and less than or equal to 2.5 microns. In some embodiments, less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, or less than or equal to 45% of the pores in the fiber web and/or phase have a diameter of greater than or equal to 1.25 microns and less than or equal to 2.5 microns. Combinations of the above-referenced ranges are also possible (e.g., greater than or equal to 40% and less than or equal to 95%). Other ranges are also possible.

When a filter media comprises two or more fiber webs and/or phases, each fiber web and/or phase may independently have a number and/or percentage of pores having a diameter of greater than or equal to 1.25 microns and less than or equal to 2.5 microns in one or more of the above-referenced ranges.

The number and/or percentage of pores having a diameter of greater than or equal to 1.25 microns and less than or equal to 2.5 microns may be measured in accordance with ASTM F316 (2003).

In some embodiments, a fiber web and/or phase may have a relatively low ratio of a number of pores that have a diameter of less 1.25 microns to a number of pores that have a diameter of greater than or equal to 1.25 microns and less than or equal to 2.5 microns. In some embodiments, this ratio is less than or equal to 1, less than or equal to 0.95, less than or equal to 0.9, less than or equal to 0.85, less than or equal to 0.8, less than or equal to 0.75, less than or equal to 0.7, less than or equal to 0.65, less than or equal to 0.6, less than or equal to 0.55, less than or equal to 0.5, less than or equal to 0.45, less than or equal to 0.4, less than or equal to 0.35, less than or equal to 0.3, less than or equal to 0.25, less than or equal to 0.2, or less than or equal to 0.15. In some embodiments, this ratio is greater than or equal to 0.1, greater than or equal to 0.15, greater than or equal to 0.2, greater than or equal to 0.25, greater than or equal to 0.3, greater than or equal to 0.35, greater than or equal to 0.4, greater than or equal to 0.45, greater than or equal to 0.5, greater than or equal to 0.55, greater than or equal to 0.6, greater than or equal to 0.65, greater than or equal to 0.7, greater than or equal to 0.75, greater than or equal to 0.8, greater than or equal to 0.85, greater than or equal to 0.9, or greater than or equal to 0.95. Combinations of the above-referenced ranges are also possible (e.g., less than or equal to 1 and greater than or equal to 0.1). Other ranges are also possible.

When a filter media comprises two or more fiber webs and/or phases, each fiber web and/or phase may independently have a ratio of a number of pores that have a diameter of less 1.25 microns to a number of pores that have a diameter of greater than or equal to 1.25 microns and less than or equal to 2.5 microns in one or more of the above-referenced ranges.

Fiber webs described herein may have a variety of suitable mean flow pore sizes. In some embodiments, a fiber web and/or phase thereof has a mean flow pore size of greater than or equal to 0.5 microns, greater than or equal to 0.75 microns, greater than or equal to 1 micron, greater than or equal to 2 microns, greater than or equal to 5 microns, greater than or equal to 7.5 microns, greater than or equal to 10 microns, greater than or equal to 12.5 microns, greater than or equal to 15 microns, greater than or equal to 17.5 microns, greater than or equal to 20 microns, or greater than or equal to 22.5 microns. In some embodiments, a fiber web and/or phase thereof has a mean flow pore size of less than or equal to 25 microns, less than or equal to 22.5 microns, less than or equal to 20 microns, less than or equal to 17.5 microns, less than or equal to 15 microns, less than or equal to 12.5 microns, less than or equal to 10 microns, less than or equal to 7.5 microns, less than or equal to 5 microns, less than or equal to 2 microns, less than or equal to 1 micron, or less than or equal to 0.75 microns. Combinations of the above-referenced ranges are also possible (e.g., greater than or equal to 0.5 microns and less than or equal to 25 microns, greater than or equal to 0.5 microns and less than or equal to 20 microns, or greater than or equal to 0.5 microns and less than or equal to 15 microns). Other ranges are also possible.

When a filter media comprises two or more fiber webs and/or phases, each fiber web and/or phase may independently have a mean flow pore size in one or more of the above-referenced ranges.

The mean flow pore size of a fiber web or a phase may be measured in accordance with ASTM F316 (2003).

Fiber webs described herein may have a variety of suitable thicknesses. In some embodiments, a fiber web and/or a phase thereof has a thickness of greater than or equal to 0.1 mm, greater than or equal to 0.2 mm, greater than or equal to 0.3 mm, greater than or equal to 0.5 mm, greater than or equal to 0.75 mm, greater than or equal to 1 mm, greater than or equal to 1.5 mm, greater than or equal to 2 mm, greater than or equal to 2.5 mm, greater than or equal to 3 mm, greater than or equal to 3.5 mm, greater than or equal to 4 mm, or greater than or equal to 4.5 mm. In some embodiments, a fiber web and/or a phase thereof has a thickness of less than or equal to 5 mm, less than or equal to 4.5 mm, less than or equal to 4 mm, less than or equal to 3.5 mm, less than or equal to 3 mm, less than or equal to 2.5 mm, less than or equal to 2 mm, less than or equal to 1.5 mm, less than or equal to 1 mm, less than or equal to 0.75 mm, less than or equal to 0.5 mm, less than or equal to 0.3 mm, or less than or equal to 0.2 mm. Combinations of the above-referenced ranges are also possible (e.g., greater than or equal to 0.1 mm and less than or equal to 5 mm, greater than or equal to 0.2 mm and less than or equal to 4.5 mm, or greater than or equal to 0.3 mm and less than or equal to 4 mm). Other ranges are also possible.

When a filter media comprises two or more fiber webs and/or phases, each fiber web and/or phase may independently have a thickness in one or more of the above-referenced ranges.

The thickness of a fiber web or phase may be measured in accordance with ISO 534 (2012) under an applied pressure of 1 N/cm².

Fiber webs described herein may have a variety of suitable air permeabilities. In some embodiments, a fiber web and/or phase has an air permeability of greater than or equal to 5 L/(m²·s), greater than or equal to 7 L/(m²·s), greater than or equal to 10 L/(m²·s), greater than or equal to 20 L/(m²·s), greater than or equal to 50 L/(m²·s), greater than or equal to 75 L/(m²·s), greater than or equal to 100 L/(m²·s), greater than or equal to 150 L/(m²·s), greater than or equal to 200 L/(m²·s), greater than or equal to 250 L/(m²·s), greater than or equal to 300 L/(m²·s), greater than or equal to 350 L/(m²·s), or greater than or equal to 380 L/(m²·s). In some embodiments, a fiber web and/or phase has an air permeability of less than or equal to 400 L/(m²·s), less than or equal to 380 L/(m²·s), less than or equal to 350 L/(m²·s), less than or equal to 300 L/(m²·s), less than or equal to 250 L/(m²·s), less than or equal to 20 L/(m²·s), less than or equal to 150 L/(m²·s), less than or equal to 100 L/(m²·s), less than or equal to 75 L/(m²·s), less than or equal to 50 L/(m²·s), less than or equal to 20 L/(m²·s), less than or equal to 10 L/(m²·s), or less than or equal to 7 L/(m²·s). Combinations of the above-referenced ranges are also possible (e.g., greater than or equal to 5 L/(m²·s) and less than or equal to 400 L/(m²·s), greater than or equal to 7 L/(m²·s) and less than or equal to 380 L/(m²·s), or greater than or equal to 10 L/(m²·s) and less than or equal to 350 L/(m²·s)). Other ranges are also possible.

When a filter media comprises two or more fiber webs and/or phases, each fiber web and/or phase may independently have an air permeability in one or more of the above-referenced ranges.

The air permeability of a fiber web and/or phase may be measured in accordance with EN/ISO 9237 (1995) at a pressure of 200 Pa.

Fiber webs described herein may have a variety of suitable pore perm indices. In some embodiments, a fiber web and/or phase has a pore perm index of greater than or equal to 0.1, greater than or equal to 0.2, greater than or equal to 0.5, greater than or equal to 0.75, greater than or equal to 1, or greater than or equal to 1.25. In some embodiments, a fiber web and/or phase has a pore perm index of less than or equal to 1.5, less than or equal to 1.25, less than or equal to 1, less than or equal to 0.75, less than or equal to 0.5, or less than or equal to 0.2. Combinations of the above-referenced ranges are also possible (e.g., greater than or equal to 0.1 and less than or equal to 1.5). Other ranges are also possible.

When a filter media comprises two or more fiber webs and/or phases, each fiber web and/or phase may independently have a pore perm index in one or more of the above-referenced ranges.

The pore perm index of a fiber web and/or phase may be computed by evaluating the following equation:

$$\text{Pore Perm Index} = \frac{\text{Mean Flow Pore size}}{\sqrt{\text{Air permeability}}}.$$

The thickness of a filter media comprising a fiber web described herein may be selected as desired. In some embodiments, a filter media has a thickness of greater than or equal to 0.1 mm, greater than or equal to 0.2 mm, greater than or equal to 0.3 mm, greater than or equal to 0.5 mm, greater than or equal to 0.75 mm, greater than or equal to 1 mm, greater than or equal to 2 mm, greater than or equal to 5 mm, greater than or equal to 7.5 mm, greater than or equal to 10 mm, greater than or equal to 12.5 mm, greater than or equal to 15 mm, or greater than or equal to 17.5 mm. In some embodiments, a filter media has a thickness of less than or equal to 20 mm, less than or equal to 17.5 mm, less than or equal to 15 mm, less than or equal to 12.5 mm, less than or equal to 10 mm, less than or equal to 7.5 mm, less than or equal to 5 mm, less than or equal to 2 mm, less than or equal to 1 mm, less than or equal to 1 mm, less than or equal to 0.75 mm, less than or equal to 0.5 mm, or less than or equal to 0.2 mm. Combinations of the above-referenced ranges are also possible (e.g., greater than or equal to 0.1 mm and less than or equal to 20 mm). Other ranges are also possible.

The thickness of a filter media may be measured in accordance with ISO 534 (2012) under an applied pressure of 1 N/cm².

The air permeability of a filter media comprising a fiber web described herein may be selected as desired. In some embodiments, a filter media has an air permeability in one or more of the ranges described elsewhere herein for the air permeability of a fiber web.

The air permeability of a filter media may be measured in accordance with EN/ISO 9237 (1995) at a pressure of 200 Pa.

As described above, in some embodiments, a fiber web (and any phases therein) is fabricated by a wet laying process. In general, a wet laying process involves mixing together fibers of one or more type; for example, a plurality of glass fibers may be mixed together on its own or with a plurality of fibrillated fibers and/or a plurality of binder fibers to provide a fiber slurry. The slurry may be, for example, an aqueous-based slurry. In some embodiments, fibers are optionally stored separately, or in combination, in various holding tanks prior to being mixed together.

In some embodiments, each plurality of fibers may be mixed and pulped together in separate containers. As an example, a plurality of glass fibers may be mixed and pulped together in one container, a plurality of fibrillated fibers may be mixed and pulped in a second container, and a plurality of binder fibers may be mixed and pulped in a third container. The pluralities of fibers may subsequently be combined together into a single fibrous mixture. Appropriate fibers may be processed through a pulper before and/or after being mixed together. In some embodiments, combinations of fibers are processed through a pulper and/or a holding tank prior to being mixed together. It can be appreciated that other components may also be introduced into the mixture (e.g., resins). Furthermore, it should be appreciated that other combinations of fibers types may be used in fiber mixtures, such as the fiber types described herein.

A wet laying process may comprise applying a single dispersion (e.g., a pulp) in a solvent (e.g., an aqueous solvent such as water) or slurry onto a wire conveyor in a paper-making machine (e.g., a fourdrinier or a rotoformer) to form a single fiber web supported by the wire conveyor. Vacuum may be continuously applied to the dispersion of fibers during the above process to remove the solvent from the fibers, thereby resulting in an article containing the single fiber web.

In some embodiments, multiple fiber webs may be formed simultaneously or sequentially in a wet laying process. For instance, a fiber web may be formed as described above, and then one or more fiber webs may be formed on that fiber web by following the same procedure. As an example, a dispersion in a solvent or slurry may be applied to a first fiber web on a wire conveyor, and vacuum applied to the dispersion or slurry to form a second fiber web on the first fiber web. Further fiber webs may be formed on the first fiber web and the second fiber web by following this same process.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, a wet laying process uses similar equipment as in a conventional papermaking process, for example, a hydropulper, a former or a headbox, a dryer, and/or an optional converter. A fiber web can also be made with a laboratory handsheet mold in some instances. As discussed above, the slurry may be prepared in one or more pulpers. After appropriately mixing the slurry in a pulper, the slurry may be pumped into a headbox where the slurry may or may not be combined with other slurries. Other additives may or may not be added. The slurry may also be diluted with additional water such that the final concentration of the fibers is in a suitable range, such as for example, between about 0.1% and 0.5% by weight.

In some cases, the pH of the slurry may be adjusted as desired. For instance, fibers of the slurry may be dispersed under acidic or neutral conditions.

Before the slurry is sent to a headbox, the slurry may optionally be passed through centrifugal cleaners and/or pressure screens for removing undesired material (e.g., unfiberized material). The slurry may or may not be passed through additional equipment such as refiners or deflakers to further enhance the dispersion of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, or an inclined wire fourdrinier.

In some embodiments, a fiber web (and any phases therein) is fabricated by a foam laying process, such as the process described in U.S. patent application Ser. No. 18/326, 932, which is incorporated by reference herein in its entirety for all purposes. Foam laying comprises, in some embodiments, adding one or more foaming additives (e.g., one or more surfactants, air) to a fiber dispersion, thereby forming a foam slurry comprising the fiber dispersion. The foam slurry may have any of a variety of suitable liquid fractions and/or foam densities that provide the foam slurry with sufficient spacing between the fibers in the foam slurry, wherein the spacing between the fibers is occupied by a liquid and/or a gas (e.g., one or more bubbles) of the foam slurry. The foam slurry is applied to a carrier and dried, thereby providing a fiber web to be used in a filter media.

Figure 3:
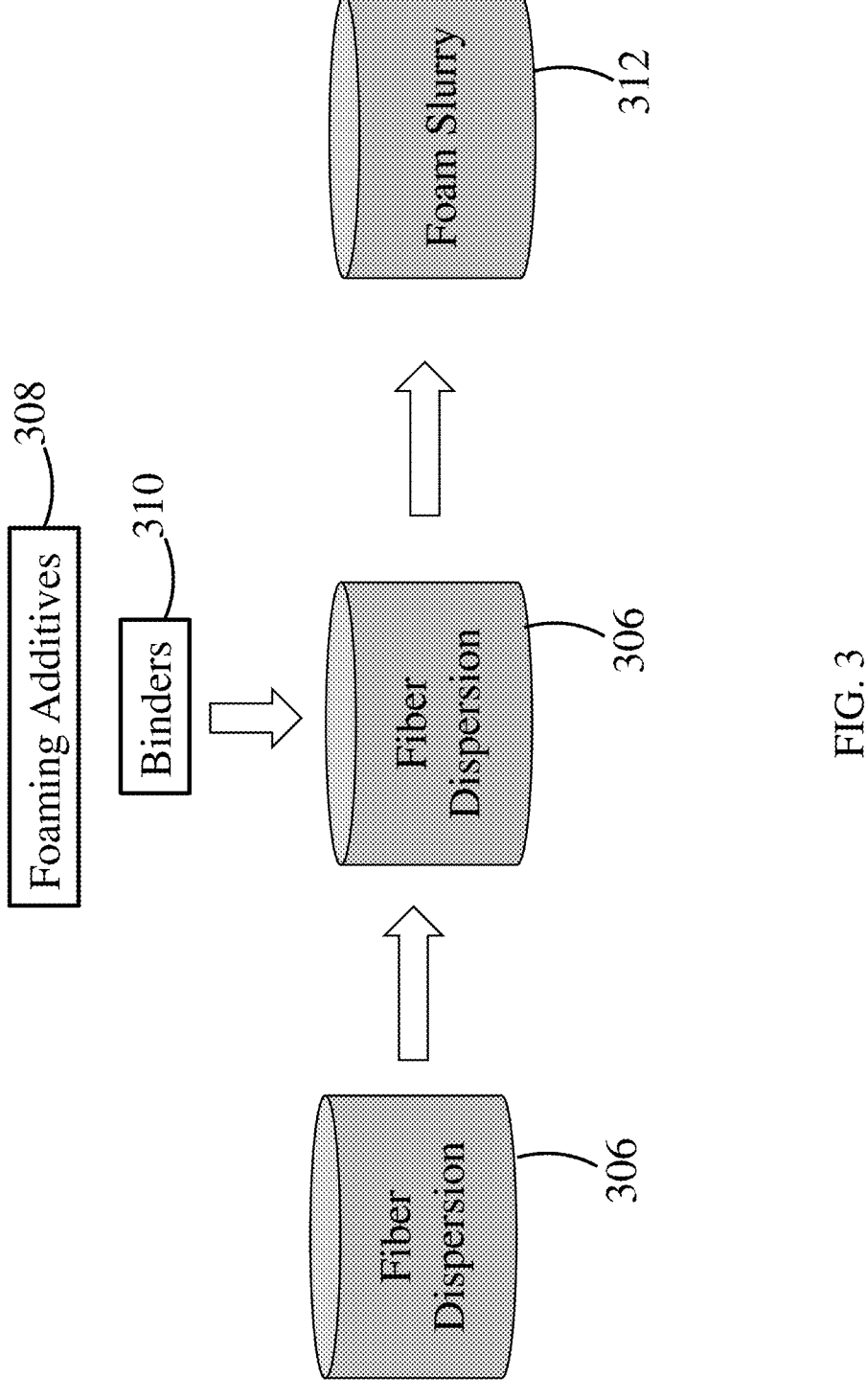
FIGS. 3-4 show, according to some embodiments, schematic diagrams depicting foam laying.
Figure 4:
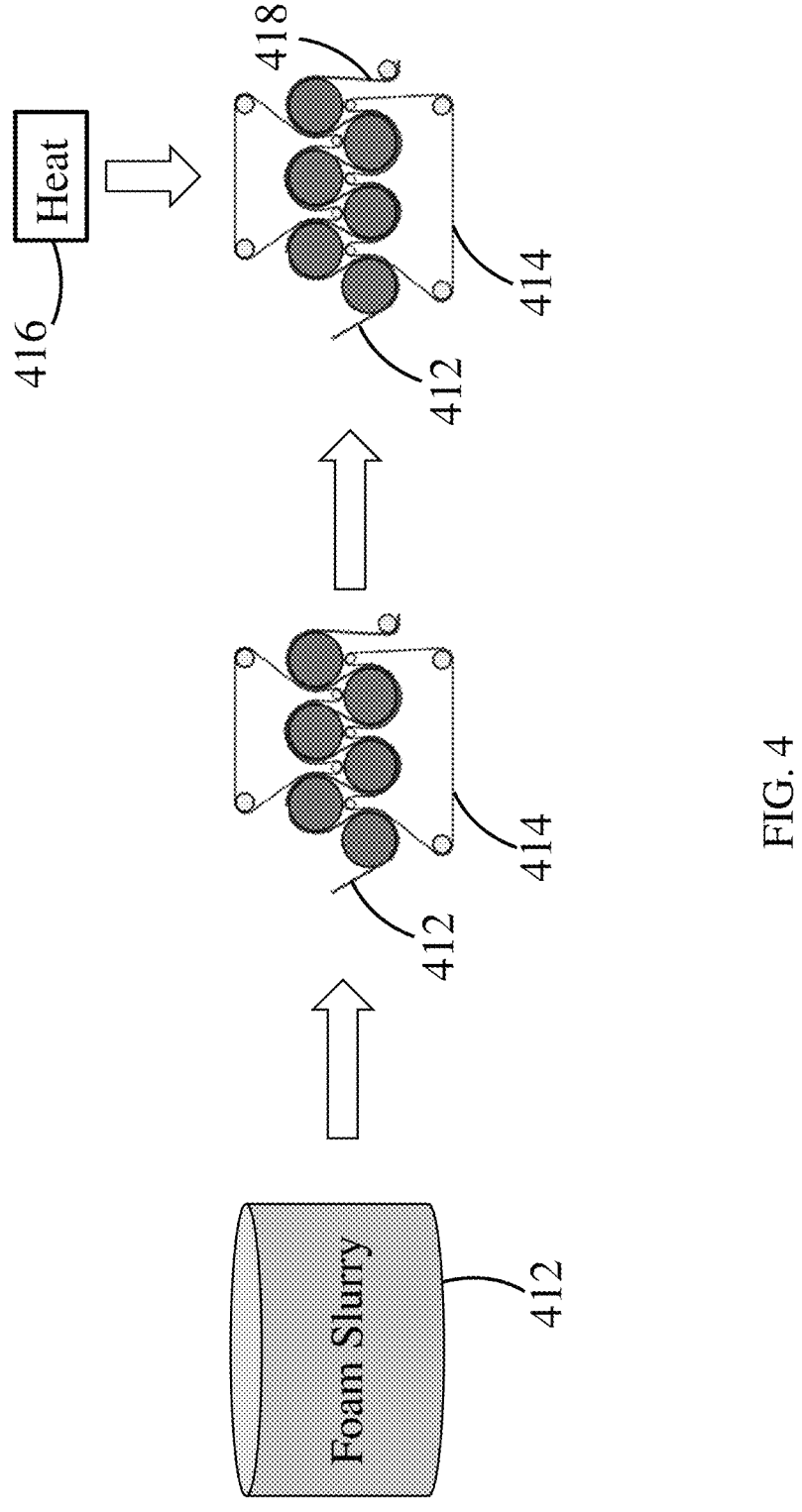

FIGS. 3-4 show, according to some embodiments, schematic diagrams depicting foam laying. Referring to FIG. 3, foam laying may comprise providing a fiber dispersion 306.

The fiber dispersion 306 comprises, in some embodiments, fibers dispersed in a liquid. In certain embodiments, the liquid comprises water. In some embodiments, providing a fiber dispersion 306 comprises forming fiber dispersion 306 in a pulper.

According to some embodiments, foam laying comprises adding one or more foaming additives to a fiber dispersion. Referring to FIG. 3, for example, the method shown therein comprises adding one or more foaming additives 308 to fiber dispersion 306. In some embodiments, adding the one or more foaming additives to a fiber dispersion provides a foam slurry wherein the fibers are relatively evenly dispersed (e.g., evenly distributed) throughout the foam slurry.

In some embodiments, one or more foaming additives that comprise a surfactant are employed. When present, the surfactant may advantageously decrease the surface tension of the liquid (e.g., water) of a fiber dispersion in which it is present. Any of a variety of suitable surfactants may be used. In some embodiments, for example, the surfactant comprises an amino-oxide, an ethoxylate, an alkyl-sulfate, an alkyl-ester, an ethanol-amine, an isotridecanolethoxylate, a poly-ester, a polyacrylate, a polysiloxane, an alkylphosphate, sodium-laurylsulfate, polyvinyl alcohol, stearylated ammonia, and/or combinations thereof.

In some embodiments, one or more foaming additives that comprise a gas are employed. When present, in certain embodiments, the gas comprises air (e.g., atmospheric air). When present, the gas (e.g., air) may be used in combination with one or more surfactants, according to certain embodiments.

In some embodiments, one or more foaming additives may be added to a fiber dispersion in the pulper. It is also possible for a fiber dispersion to be transferred (e.g., flowed) from a pulper to a foam former prior to adding the one or more foaming additives to the fiber dispersion.

In certain embodiments, foam laying comprises adding one or more resins to the fiber dispersion. Referring to FIG. 3, for example, foam laying may comprise adding one or more resins 310 to fiber dispersion 306.

In some embodiments, one or more binders may be added to a fiber dispersion in the pulper. It is also possible for a fiber dispersion to be transferred (e.g., flowed) from a pulper to a foam former prior to adding one or more binders to the fiber dispersion.

In some embodiments, foam laying comprises forming a foam slurry comprising a fiber dispersion. The foam slurry may be formed, in some embodiments, as a result of adding one or more foaming additives (e.g., one or more surfactants and/or air) to the fiber dispersion. Referring to FIG. 3, for example, the method comprises forming foam slurry 312 as a result of adding one or more foaming additives 308 to the fiber dispersion 306.

In some embodiments, a foam slurry may be formed in a foam former. For example, in certain embodiments, a fiber dispersion may be transferred (e.g., flowed) from a pulper to a foam former prior to adding the one or more foaming additives to the fiber dispersion.

Foam formers may comprise any of a variety of suitable fluidic connections. In certain embodiments, for example, a foam former comprises one or more fluidic connections that are configured to transfer (e.g., flow) a fiber dispersion from a pulper to a foam former. In some embodiments, the one or more fluidic connections configured to transfer the fiber dispersion from the pulper to the foam former may be configured to control a flow rate of the fiber dispersion. The foam former may, in some embodiments, comprise one or more fluidic connections that are configured to add one or more foaming additives and/or one or more binders to the fiber dispersion. In certain embodiments, one or more fluidic connections configured to add the one or more foaming additives and/or one or more binders to the fiber dispersion may be configured to control a flow rate of the one or more foaming additives and/or the one or more binders.

In some embodiments, a foam former may comprise one or more temperature regulators for regulating the temperature of a foam slurry in the foam former.

In certain embodiments, a foam former may comprise one or more pressure regulators for regulating the pressure of a foam slurry in the foam former.

According to some embodiments, foam laying comprises applying a foam slurry onto a carrier. Referring to FIG. 4, for example, foam laying may comprise applying a foam slurry 412 onto carrier 414. In certain embodiments, a carrier 414 is a semi-continuous or a continuous moving carrier. According to certain embodiments, a carrier 414 is planar. In some embodiments, for example, a foam slurry 412 is applied onto a planar carrier 414 such that the foam slurry 412 has a two-dimensional, planar configuration.

Any of a variety of suitable carriers may be employed. In some embodiments, for example, a carrier 414 may be a wire.

In some embodiments, applying a foam slurry onto a carrier (e.g., a semi-continuous or a continuous moving carrier) comprises flowing the foam slurry through an applicator and onto the carrier. The applicator may be configured, in some embodiments, to spread the foam slurry evenly onto the carrier (e.g., wire).

Any of a variety of suitable applicators may be employed, such as a headbox, a foam nozzle, a curtain coater, and/or a slot die.

In certain embodiments, foam laying comprises drying a foam slurry. Referring to FIG. 4, for example, the method shown therein comprises applying heat 416 to a foam slurry 412. In some embodiments, heat 416 may be applied to a foam slurry 412 as the foam slurry 412 travels along the carrier 414. For example, in some embodiments, applying heat 416 to a foam slurry 412 as the foam slurry 412 travels along the carrier 414 comprises a contact drying process such that the foam slurry 412 is in contact with a heated surface. In some such embodiments, the carrier 414 may be the heated surface. According to some embodiments, applying heat 416 to a foam slurry 412 evaporates liquid (e.g., water) as the foam slurry 412 travels along a carrier 414. Liquid (e.g., water) may be drained from the foam slurry with or without the application of heat, in certain embodiments.

Foam slurries may be dried using any of a variety of suitable heat sources. In some embodiments, for example, a foam slurry may be dried using one or more heated drying cans and/or cylinders, air dryers and/or ovens (e.g., through air dryers and/or ovens), belt dryers, and/or infrared (IR) heaters.

The filter media described herein may be employed in a variety of applications. In some embodiments, a filter media described herein is a coalescer filter media. In some embodiments, a filter media described herein is capable of separating and/or configured to separate oil from a gas (e.g., a compressed gas, air).

In some embodiments, a filter media described herein is a component of a filter element (e.g., a coalescer filter element). That is, a filter media may be incorporated into an article suitable for use by an end user.

Non-limiting examples of suitable filter elements include flat panel filters, wire back panel filters, cartridge filters, spin-on filter elements, integrated filter elements, pleated panel filters, pocket filters, mini pleat filters, V-bank filters (comprising, e.g., between 1 and 24 Vs), thermally molded filters, cylindrical filters, conical filters, channel flow filters, and radial seal filters. Channel flow filters may comprise alternating rows of flat filter media and corrugated filter media. In some embodiments, these alternating rows may surround a honeycomb network of channels. In some embodiments, a channel flow filter may comprise some channels that are sealed with an adhesive (e.g., the channel flow filter may comprise alternating sealed and unsealed channels). In use, air may flow into open channels in a channel flow filter, through the filter element, and then out an adjacent open channel.

Filter elements may have a variety of suitable shapes, such as round, oval, cubic, and/or prismatic. Filter elements may have any suitable height (e.g., between 2 in and 124 in for flat panel filters, between 4 in and 124 in for V-bank filters, between 1 in and 124 in for cartridge and cylindrical filter media). Filter elements may also have any suitable width (between 2 in and 124 in for flat panel filters, between 4 in and 124 in for V-bank filters). Some filter media (e.g., cartridge filter media, cylindrical filter media) may be characterized by a diameter instead of a width; these filter media may have a diameter of any suitable value (e.g., between 1 in and 124 in). Filter elements typically comprise a frame, which may be made of one or more materials such as cardboard, aluminum, steel, alloys, wood, and polymers.

Filter elements described herein may be single stage elements or multiple stage elements. In some cases, a filter media can be pleated or wrapped (e.g., around a core), supported or unsupported, cowrapped/copleated with multiple filter media. In some designs, a filter media is pleated with a wrapped core in the center.

In some embodiments, a filter media described herein is a component of a filter element and is pleated. As described above, in some embodiments, a filter media described herein may be a component of a filter element and may be pleated. Without wishing to be bound by any particular theory, it is believed that pleating a filter media advantageously increases the surface area thereof in a manner proportional to the number of pleats present. This increased surface area may enhance the filtration efficiency of the filter media. Some pleated filter media may comprise two or more layers that were joined by a co-pleating process. Pleating may be accomplished by forming score lines at appropriately spaced distances apart from one another, allowing the filter media to be folded.

The pleat height and pleat density (number of pleats per unit length of the filter media) may be selected as desired. In some embodiments, the pleat height is greater than or equal to 3 mm, greater than or equal to 5 mm, greater than or equal to 10 mm, greater than or equal to 15 mm, greater than or equal to 20 mm, greater than or equal to 25 mm, greater than or equal to 30 mm, greater than or equal to 35 mm, greater than or equal to 40 mm, greater than or equal to 45 mm, greater than or equal to 50 mm, greater than or equal to 53 mm, greater than or equal to 55 mm, greater than or equal to 60 mm, greater than or equal to 65 mm, greater than or equal to 70 mm, greater than or equal to 75 mm, greater than or equal to 80 mm, greater than or equal to 85 mm, greater than or equal to 90 mm, greater than or equal to 95 mm, greater than or equal to 100 mm, greater than or equal to 125 mm, greater than or equal to 150 mm, greater than or equal to 175 mm, greater than or equal to 200 mm, greater than or equal to 225 mm, greater than or equal to 250 mm, greater than or equal to 275 mm, greater than or equal to 300 mm, greater than or equal to 325 mm, greater than or equal to 350 mm, greater than or equal to 375 mm, greater than or equal to 400 mm, greater than or equal to 425 mm, greater than or equal to 450 mm, greater than or equal to 475 mm, or greater than or equal to 500 mm. In some embodiments, the pleat height is less than or equal to 510 mm, less than or equal to 500 mm, less than or equal to 475 mm, less than or equal to 450 mm, less than or equal to 425 mm, less than or equal to 400 mm, less than or equal to 375 mm, less than or equal to 350 mm, less than or equal to 325 mm, less than or equal to 300 mm, less than or equal to 275 mm, less than or equal to 250 mm, less than or equal to 225 mm, less than or equal to 200 mm, less than or equal to 175 mm, less than or equal to 150 mm, less than or equal to 125 mm, less than or equal to 100 mm, less than or equal to 95 mm, less than or equal to 90 mm, less than or equal to 85 mm, less than or equal to 80 mm, less than or equal to 75 mm, less than or equal to 70 mm, less than or equal to 65 mm, less than or equal to 60 mm, less than or equal to 55 mm, less than or equal to 53 mm, less than or equal to 50 mm, less than or equal to 45 mm, less than or equal to 40 mm, less than or equal to 35 mm, less than or equal to 30 mm, less than or equal to 25 mm, less than or equal to 20 mm, less than or equal to 15 mm, less than or equal to 10 mm, or less than or equal to 5 mm. Combinations of the above-referenced ranges are also possible (e.g., greater than or equal to 3 mm and less than or equal to 510 mm, greater than or equal to 10 mm and less than or equal to 510 mm, or greater than or equal to 10 mm and less than or equal to 100 mm). Other ranges are also possible.

In some embodiments, a filter media has a pleat density of greater than or equal to 5 pleats per 100 mm, greater than or equal to 6 pleats per 100 mm, greater than or equal to 10 pleats per 100 mm, greater than or equal to 15 pleats per 100 mm, greater than or equal to 20 pleats per 100 mm, greater than or equal to 25 pleats per 100 mm, greater than or equal to 28 pleats per 100 mm, greater than or equal to 30 pleats per 100 mm, or greater than or equal to 35 pleats per 100 mm. In some embodiments, a filter media has a pleat density of less than or equal to 40 pleats per 100 mm, less than or equal to 35 pleats per 100 mm, less than or equal to 30 pleats per 100 mm, less than or equal to 28 pleats per 100 mm, less than or equal to 25 pleats per 100 mm, less than or equal to 20 pleats per 100 mm, less than or equal to 15 pleats per 100 mm, less than or equal to 10 pleats per 100 mm, or less than or equal to 6 pleats per 100 mm. Combinations of the above-referenced ranges are also possible (e.g., greater than or equal to 5 pleats per 100 mm and less than or equal to 100 pleats per 100 mm, greater than or equal to 6 pleats per 100 mm and less than or equal to 100 pleats per 100 mm, or greater than or equal to 25 pleats per 100 mm and less than or equal to 28 pleats per 100 mm). Other ranges are also possible.

Other pleat heights and densities may also be possible. For instance, filter media within flat panel or V-bank filters may have pleat heights between ¼ in and 24 in, and/or pleat densities between 1 pleat/in and 50 pleats/in. As another example, filter media within cartridge filters or conical filters may have pleat heights between ¼ in and 24 in and/or pleat densities between ½ pleats/in and 100 pleats/in.

In some embodiments, pleats are separated by a pleat separator made of, e.g., polymer, glass, aluminum, and/or cotton. In other embodiments, the filter element lacks a pleat separator. When present, the pleat separator may be positioned on an upstream surface of the filter media and/or may be positioned on a downstream surface of the filter media. The pleat separator may comprise portions that separate the pleats and have a width (i.e., in the direction separating the pleats) of greater than or equal to ½ in, greater than or equal to 1 in, greater than or equal to 1.5 in, greater than or equal to 2 in, greater than or equal to 2.5 in, greater than or equal to 3 in, greater than or equal to 3.5 in, or greater than or equal to 4 in. In some embodiments, a pleat separator comprises portions that separate the pleats and have a width of less than or equal to 5 in, less than or equal to 4 in, less than or equal to 3.5 in, less than or equal to 3 in, less than or equal to 2.5 in, less than or equal to 2 in, less than or equal to 1.5 in, or less than or equal to 1 in. Combinations of the above-referenced ranges are also possible (e.g., greater than or equal to 3 in and less than or equal to 2 in, greater than or equal to 2 in and less than or equal to 1 in).

In some embodiments, a filter media comprises one or more additional structural elements. For instance, a filter media may further comprise a stiffening element, such as a polymeric mesh and/or a metallic mesh. As another example, a filter media may further comprise a screen backing, which may assist with retaining the filter media in a pleated configuration. Such filter media may be wire-backed (e.g., by an expanded metal wire) and/or comprise an extruded plastic mesh. It is also possible for filter media to be self-supporting.

Some embodiments relate to methods in which a fluid is passed through a filter media described herein (e.g., a filter media that is positioned in a filter element). The fluid may be a gas, such as a compressed gas and/or air (e.g., compressed or uncompressed). The fluid passing through the filter media may further comprise one or more contaminants to be filtered and/or separated therefrom by the filter media. In some such embodiments, the fluid comprises an oil that is a contaminant.

EXAMPLE 1

This Example compares the performance of wet laid non-woven fiber webs having different basis weights. It also compares the performance of single-layer wet laid non-woven fiber webs to dual-layer filter media.

Selected physical properties of various wet laid non-woven fibers webs and filter media were measured as described elsewhere herein and summarized in Tables 3-5. The fiber webs compared all included microglass fibers and an oleophilic resin. The dual-layer filter media included two fiber webs including microglass fibers and an oleophilic resin.

TABLE 3

| Sample No. | Basis Weight (gsm) | Thickness (mm) | Air Permeability $(L/(m^2 \cdot s))$ | Mean Flow Pore Size (microns) |
|---|---|---|---|---|
| 1 | 203 | 1.14 | 24 | 2.7 |
| 2 | 191 | 1.14 | 26 | 2.8 |
| 3 | 208 | 1.33 | 48 | 4.8 |
| 4 | 73 | 0.38 | 28 | 2.3 |
| 5 | 75 | 0.40 | 46 | 3.3 |
| 6 | 95 | 0.62 | 75 | 4.8 |
| 7 | 146 | 0.74 | 15 | 1.5 |
| 8 | 150 | 0.80 | 23 | 1.9 |
| 9 | 190 | 1.24 | 33 | 3.2 |

TABLE 4

| Sample No. | Percentage of Pores Having a Diameter of Less than 1.25 Microns (%) | Percentage of Pores Having a Diameter of Greater than or Equal to 1.25 Microns and Less than 2.5 Microns (%) | Ratio of Two Preceding Columns |
|---|---|---|---|
| 1 | 39.8 | 45.5 | 0.87 |
| 2 | 27.8 | 55.3 | 0.5 |
| 3 | 26.4 | 46.7 | 0.57 |
| 7 | 75.6 | 21.1 | 3.6 |
| 8 | 58.6 | 35 | 1.7 |
| 9 | 57.3 | 31 | 1.8 |

TABLE 5

| Sample No. | Saturated Pressure Drop (mbar) | Efficiency (%) | Coalescer Gamma |
|---|---|---|---|
| 1 | 124.3 | 99.99324 | 29.8 |
| 2 | 142.9 | 99.9984728 | 29.7 |
| 3 | 85.1 | 99.94184 | 26.3 |
| 4 | 170.1 | 99.996704 | 38.0 |
| 5 | 120.7 | 99.9414 | 37.3 |
| 6 | 98 | 99.9742 | 37.9 |
| 7 | 224.3 | 99.998448 | 46.6 |
| 8 | 168.8 | 99.996936 | 37.3 |
| 9 | 128.3 | 99.975244 | 35.6 |

As can be seen from Tables 3 and 5, single-layer Samples having higher basis weights had coalescer gammas below 30 while those having lower basis weights had coalescer gammas above 30. This held true across varying efficiencies, saturated pressure drops, air permeabilites, and mean flow pore sizes. It can be seen that, for single-layer Samples having comparable air permeabilities, Samples with higher basis weights had lower saturated pressure drops and higher efficiencies. Similarly, for Samples having comparable saturated pressure drops, those with higher basis weights had higher efficiencies (compare, e.g., Sample No. 1 to Sample No. 5, which have comparable mean flow pore sizes).

As can be seen from Tables 3 and 5, single-layer Samples outperformed dual-layer Samples having comparable total basis weights and mean flow pore sizes. For instance, Sample 2 had a lower pressure drop, higher efficiency, and lower coalescer gamma than Sample 8, to which it had a comparable air permeability. As another example, Sample 2 had a higher efficiency and lower coalescer gamma than Sample 9, to which it had a comparable basis weight and mean flow pore size.

Table 4 shows that the pore size distribution of a Sample affects performance. This can be seen by comparing the data in Table 5 for Samples 2 and 3 with that for Samples 7-9. The former Samples have fewer pores having a diameter of less than 1.25 microns and more pores having a diameter of greater than or equal to 1.25 microns and less than 2.5 microns than the latter Samples. The former Samples all also have lower values of coalescer gamma than the latter Samples.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A filter media, comprising:
a fiber web, comprising glass fibers and a resin, wherein:
  the fiber web has a coalescer gamma value of less than or equal to 30,
  the fiber web has a basis weight of greater than or equal to 130 gsm, and
  the fiber web is oleophilic.

2. A filter media, comprising:
a fiber web, comprising glass fibers, wherein:
  the fiber web has a basis weight of greater than or equal to 130 gsm,
  the fiber web comprises pores,
  pores having a diameter of less than 1.25 microns make up less than or equal to 30% of the pores,
  pores having a diameter of greater than or equal to 1.25 microns and less than 2.5 microns make up greater than or equal to 40% of the pores, and a ratio of a number of pores having a diameter of less than 1.25 microns to a number of pores having a diameter of greater than or equal to 1.25 microns and less than 2.5 microns is less than or equal to 1.

3. A filter media as in claim 1, wherein the fiber web is a non-woven fiber web.

4. A filter media as in claim 1, wherein the fiber web is wet laid.

5. A filter media as in claim 1, wherein the resin is oleophilic.

6. A filter media as in claim 1, wherein the resin is hydrophilic.

7. A filter media as in claim 1, wherein the resin is hydrophobic.

8. A filter media as in claim 1, wherein the fiber web comprises microglass fibers.

9. A filter media as in claim 1, wherein the glass fibers have an average diameter of greater than or equal to 0.2 microns and less than or equal to 6 microns.

10. A filter media as in claim 1, wherein the fiber web comprises synthetic fibers.

11. A filter media as in claim 1, wherein the fiber web comprises fibrillated fibers.

12. A filter media as in claim 1, wherein the filter media comprises binder fibers.

13. A filter media as in claim 1, wherein the basis weight of the fiber web is greater than or equal to 150 gsm and less than or equal to 400 gsm.

14. A filter media as in claim 1, wherein the fiber web has an air permeability of greater than or equal to 5 $L/(m^2 \cdot s)$ and less than or equal to 400 $L/(m^2 \cdot s)$.

15. A filter media as in claim 1, wherein the fiber web has a thickness of greater than or equal to 0.1 mm and less than or equal to 5 mm.

16. A filter media as in claim 1, wherein the fiber web has a mean flow pore size of greater than or equal to 0.5 microns and less than or equal to 15 microns.

17. A filter media as in claim 1, wherein the filter media further comprises an additional layer.

18. A coalescer filter element comprising the filter media of claim 1.

19. A method comprising passing a fluid through the filter media of claim 1.

20. A method as in claim 19, wherein the fluid comprises a gas and comprises oil.

\* \* \* \* \*